United States Patent
Kung et al.

(10) Patent No.: US 12,089,283 B2
(45) Date of Patent: Sep. 10, 2024

(54) METHOD AND APPARATUS FOR DOWNLINK DISCONTINUOUS RECEPTION REGARDING SIDELINK TRANSMISSION IN A WIRELESS COMMUNICATION SYSTEM

(71) Applicant: ASUS Technology Licensing Inc., Taipei (TW)

(72) Inventors: Yi-Hsuan Kung, Taipei (TW); Yu-Hsuan Guo, Taipei (TW)

(73) Assignee: ASUS Technology Licensing Inc., Taipei (TW)

( * ) Notice: Subject to any disclaimer, the term of this patent is extended or adjusted under 35 U.S.C. 154(b) by 0 days.

(21) Appl. No.: 18/537,687

(22) Filed: Dec. 12, 2023

(65) Prior Publication Data

US 2024/0224378 A1    Jul. 4, 2024

Related U.S. Application Data

(60) Provisional application No. 63/435,162, filed on Dec. 23, 2022.

(51) Int. Cl.
*H04W 76/28* (2018.01)
*H04L 1/1812* (2023.01)
(Continued)

(52) U.S. Cl.
CPC .......... *H04W 76/28* (2018.02); *H04L 1/1812* (2013.01); *H04W 72/12* (2013.01); *H04W 72/232* (2023.01); *H04W 92/18* (2013.01)

(58) Field of Classification Search
CPC ... H04W 76/28; H04W 72/12; H04W 72/232; H04W 92/18; H04W 72/20; H04L 1/1812; H04L 1/1829
See application file for complete search history.

(56) References Cited

U.S. PATENT DOCUMENTS

2022/0191965 A1*  6/2022  Agiwal ................. H04L 1/0025
2022/0312241 A1    9/2022  Xu et al.
(Continued)

FOREIGN PATENT DOCUMENTS

CN          112399644 A     2/2021

OTHER PUBLICATIONS

Extended European Search Report to the corresponding European patent application rendered by the European Patent Office (EPO) on Apr. 24, 2024, 8 pages.
(Continued)

*Primary Examiner* — Hanh N Nguyen
(74) *Attorney, Agent, or Firm* — Skaar Ulbrich Macari, P.A.

(57) ABSTRACT

A method a User Equipment (UE) can comprise receiving a configuration of a first Discontinuous Reception (DRX) timer with a value in number of symbols, receiving a configuration of a second DRX timer with a value in number of slot lengths, transmitting, via a Sidelink (SL) Hybrid Automatic Repeat Request (HARQ) process, a first SL transmission associated with SL configured grant Type 1, starting the first DRX timer for the SL HARQ process in response to the first SL transmission, wherein the UE determines a first symbol length associated with the first DRX timer based on a symbol length of an active Downlink (DL) Bandwidth Part (BWP) of a Primary Cell (PCell), starting the second DRX timer for the SL HARQ process in response to expiration of the first DRX timer which was started in response to the first SL transmission, wherein the UE determines a first slot length associated with the second DRX timer based on a slot length of the active DL BWP of the PCell, and monitoring Physical Downlink Control Channel (PDCCH) when the second DRX timer is running.

20 Claims, 7 Drawing Sheets

(51) Int. Cl.
*H04W 72/12* (2023.01)
*H04W 72/232* (2023.01)
*H04W 92/18* (2009.01)

(56) References Cited

U.S. PATENT DOCUMENTS

| | | | | |
|---|---|---|---|---|
| 2023/0112798 A1* | 4/2023 | Lee | ........................ | H04W 76/28 |
| | | | | 370/329 |
| 2023/0156746 A1* | 5/2023 | Park | ........................ | H04L 1/1812 |
| 2023/0156857 A1* | 5/2023 | Hong | .................... | H04W 76/28 |
| | | | | 370/328 |
| 2024/0015838 A1* | 1/2024 | Ashraf | .................. | H04W 76/14 |

OTHER PUBLICATIONS

CATT: "UP Leftover Issues on SL DRX", 3GPP Draft; R2-2207525; Aug. 17, 2022, 12 pages.

* cited by examiner

METHOD AND APPARATUS FOR DOWNLINK DISCONTINUOUS RECEPTION REGARDING SIDELINK TRANSMISSION IN A WIRELESS COMMUNICATION SYSTEM

CROSS-REFERENCE TO RELATED APPLICATIONS

The present Application claims priority to and the benefit of U.S. Provisional Patent Application Ser. No. 63/435,162, filed Dec. 23, 2022, which is fully incorporated herein by reference.

FIELD

This disclosure generally relates to wireless communication networks and, more particularly, to a method and apparatus for downlink discontinuous reception regarding sidelink transmission in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

Methods, systems, and apparatuses are provided for downlink discontinuous reception regarding sidelink transmission in a wireless communication system to enhance Uu Discontinuous Reception (DRX) regarding Sidelink (SL) communication.

In various embodiments, a method of a User Equipment (UE) can comprise receiving a configuration of a first DRX timer with a value in number of symbols, receiving a configuration of a second DRX timer with a value in number of slot lengths, transmitting, via an SL Hybrid Automatic Repeat Request (HARQ) process, a first SL transmission associated with SL configured grant Type 1, starting the first DRX timer for the SL HARQ process in response to the first SL transmission, wherein the UE determines a first symbol length associated with the first DRX timer based on a symbol length of an active Downlink (DL) Bandwidth Part (BWP) of a Primary Cell (PCell), starting the second DRX timer for the SL HARQ process in response to expiration of the first DRX timer which was started in response to the first SL transmission, wherein the UE determines a first slot length associated with the second DRX timer based on a slot length of the active DL BWP of the PCell, and monitoring Physical Downlink Control Channel (PDCCH) when the second DRX timer is running.

DETAILED DESCRIPTION

The invention described herein can be applied to or implemented in exemplary wireless communication systems and devices described below. In addition, the invention is described mainly in the context of the 3GPP architecture reference model. However, it is understood that with the disclosed information, one skilled in the art could easily adapt for use and implement aspects of the invention in a 3GPP2 network architecture as well as in other network architectures.

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced) wireless access, 3GPP2 UMB (Ultra Mobile Broadband), WiMax, 3GPP NR (New Radio), or some other modulation techniques.

In particular, the exemplary wireless communication systems and devices described below may be designed to support one or more standards such as the standard offered by a consortium named "3rd Generation Partnership Project" referred to herein as 3GPP, including: [1] 3GPP 38.321 v17.2.0; and [2] 3GPP 38.331 v17.2.0. The standards and documents listed above are hereby expressly and fully incorporated herein by reference in their entirety.

Figure 1:
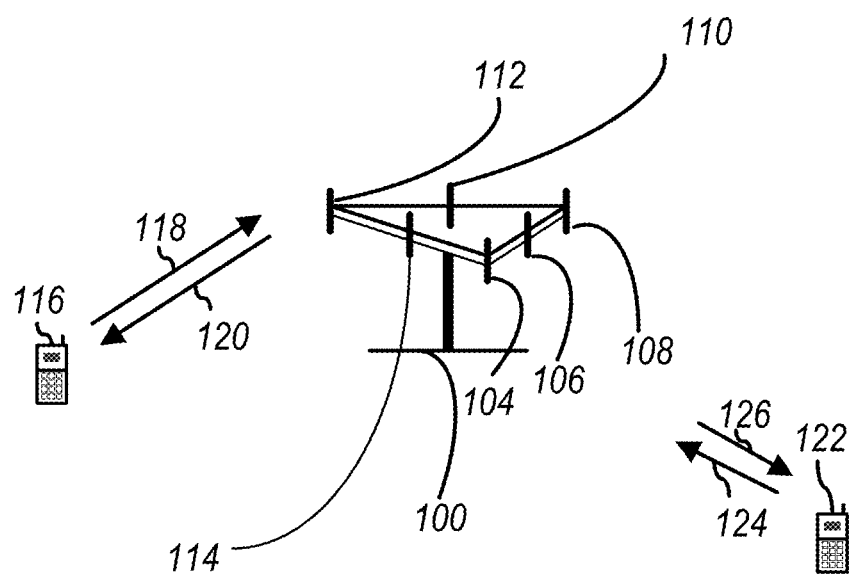
FIG. 1 shows a diagram of a wireless communication system, in accordance with embodiments of the present invention.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal (AT) 116 is in communication with antennas 112 and 114, where antennas 112 and 114 transmit information to access terminal 116 over forward link 120 and receive information from AT 116 over reverse link 118. AT 122 is in communication with antennas 106 and 108, where antennas 106 and 108 transmit information to AT 122 over forward link 126 and receive information from AT 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage normally causes less interference to access terminals in neighboring cells than an access network transmitting through a single antenna to all its access terminals.

The AN may be a fixed station or base station used for communicating with the terminals and may also be referred to as an access point, a Node B, a base station, an enhanced base station, an eNodeB, or some other terminology. The AT may also be called User Equipment (UE), a wireless communication device, terminal, access terminal or some other terminology.

Figure 2:
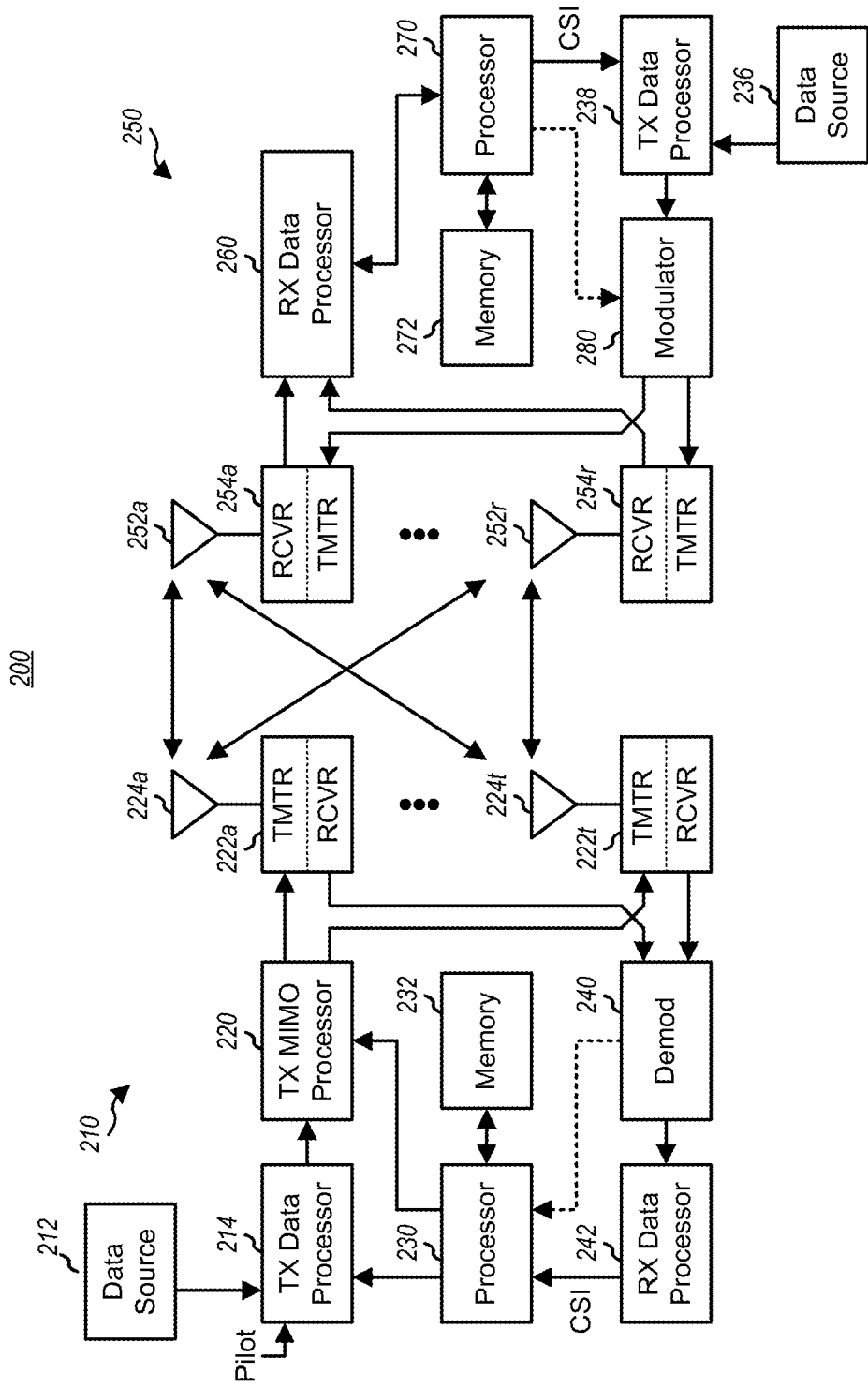
FIG. 2 is a block diagram of a transmitter system (also known as access network) and a receiver system (also known as user equipment or UE), in accordance with embodiments of the present invention.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230. A memory 232 is coupled to processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by NR antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Memory 232 may be used to temporarily store some buffered/computational data from 240 or 242 through Processor 230, store some buffed data from 212, or store some specific program codes. And Memory 272 may be used to temporarily store some buffered/computational data from 260 through Processor 270, store some buffed data from 236, or store some specific program codes.

Figure 3:
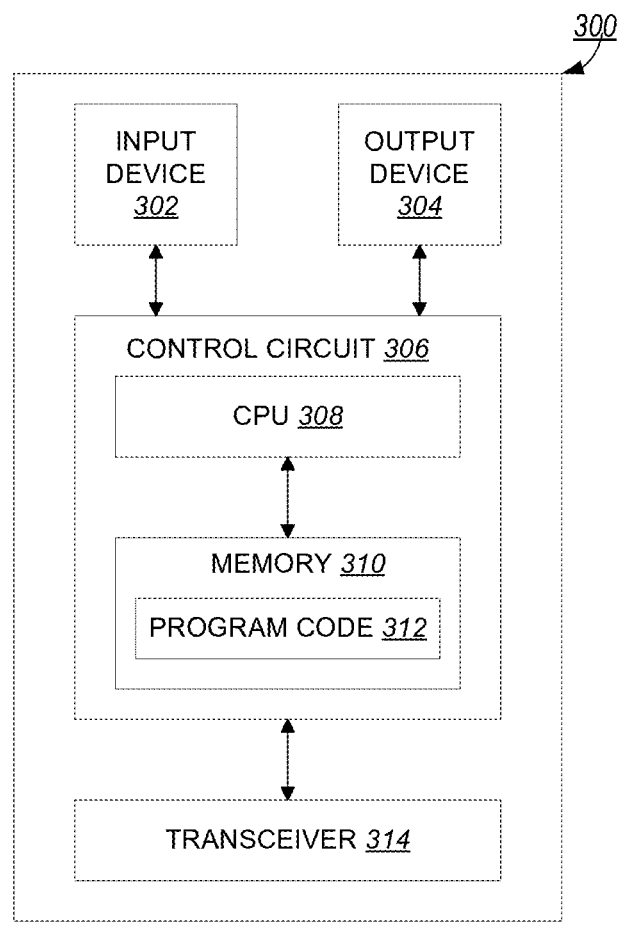
FIG. 3 is a functional block diagram of a communication system, in accordance with embodiments of the present invention.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, and the wireless communications system is preferably the $N_R$ system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
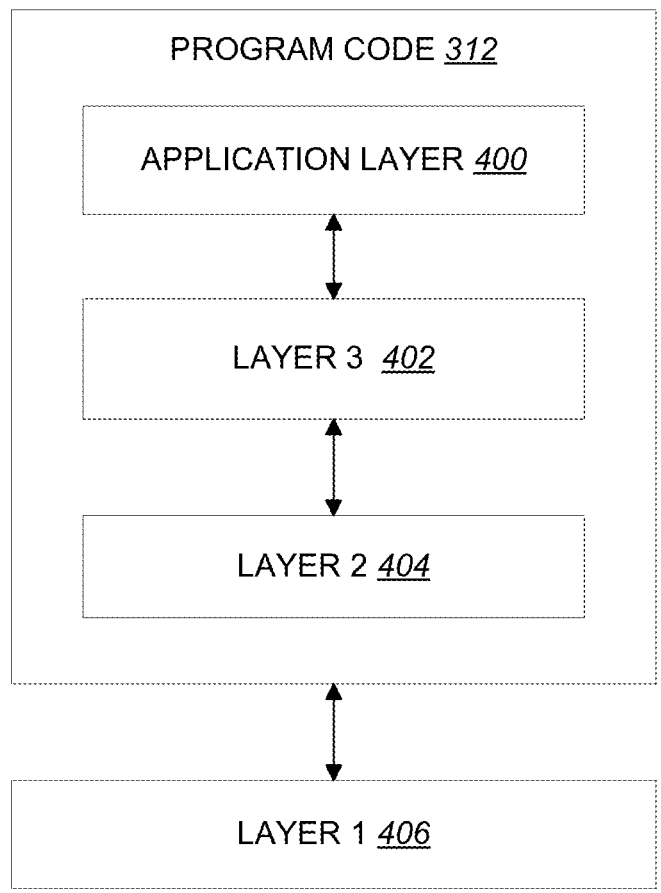
FIG. 4 is a functional block diagram of the program code of FIG. 3, in accordance with embodiments of the present invention.

FIG. 4 is a simplified block diagram of the program code 312 shown in FIG. 3 in accordance with an embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

For LTE, LTE-A, or $N_R$ systems, the Layer 2 portion 404 may include a Radio Link Control (RLC) layer and a Medium Access Control (MAC) layer. The Layer 3 portion 402 may include a Radio Resource Control (RRC) layer.

Any two or more than two of the following paragraphs, (sub-)bullets, points, actions, or claims described in each invention paragraph or section may be combined logically, reasonably, and properly to form a specific method.

Any sentence, paragraph, (sub-)bullet, point, action, or claim described in each of the following invention paragraphs or sections may be implemented independently and separately to form a specific method or apparatus. Dependency, e.g., "based on", "more specifically", "example", etc., in the following invention disclosure is just one possible embodiment which would not restrict the specific method or apparatus.

In 38.321 ([1] 3GPP 38.321 v17.2.0), Discontinuous reception (DRX), configured grant, and SL operation are introduced:

5.7 Discontinuous Reception (DRX)

The MAC entity may be configured by RRC with a DRX functionality that controls the UE's PDCCH monitoring activity for the MAC entity's C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, AI-RNTI, SL-RNTI, SLCS-RNTI and SL Semi-Persistent Scheduling V-RNTI. When using DRX operation, the MAC entity shall also monitor PDCCH according to requirements found in other clauses of this specification. When in RRC_CONNECTED, if DRX is configured, for all the activated Serving Cells, the MAC entity may monitor the PDCCH discontinuously using the DRX operation specified in this clause; otherwise the MAC entity shall monitor the PDCCH as specified in TS 38.213 [6].

NOTE 1: Void

RRC controls DRX operation by configuring the following parameters:

drx-onDurationTimer: the duration at the beginning of a DRX cycle;

drx-SlotOffset: the delay before starting the drx-onDurationTimer;

drx-InactivityTimer: the duration after the PDCCH occasion in which a PDCCH indicates a new UL, DL or SL transmission for the MAC entity;

drx-RetransmissionTimerDL (per DL HARQ process except for the broadcast process): the maximum duration until a DL retransmission is received;

drx-RetransmissionTimerUL (per UL HARQ process): the maximum duration until a grant for UL retransmission is received;

drx-Long CycleStartOffset: the Long DRX cycle and drx-StartOffset which defines the subframe where the Long and Short DRX cycle starts;

drx-ShortCycle (optional): the Short DRX cycle;

drx-ShortCycleTimer (optional): the duration the UE shall follow the Short DRX cycle;

drx-HARQ-RTT-TimerDL (per DL HARQ process except for the broadcast process): the minimum duration before a DL assignment for HARQ retransmission is expected by the MAC entity;

drx-HARQ-RTT-TimerUL (per UL HARQ process): the minimum duration before a UL HARQ retransmission grant is expected by the MAC entity;

drx-RetransmissionTimerSL (per SL HARQ process): the maximum duration until a grant for SL retransmission is received;

drx-HARQ-RTT-TimerSL (per SL HARQ process): the minimum duration before an SL retransmission grant is expected by the MAC entity;

ps-Wakeup (optional): the configuration to start associated drx-onDurationTimer in case DCP is monitored but not detected;

ps-TransmitOtherPeriodicCSI (optional): the configuration to report periodic CSI that is not L1-RSRP on PUCCH during the time duration indicated by drx-onDurationTimer in case DCP is configured but associated drx-onDurationTimer is not started;

ps-TransmitPeriodicL1-RSRP (optional): the configuration to transmit periodic CSI that is L1-RSRP on PUCCH during the time duration indicated by drx-onDurationTimer in case DCP is configured but associated drx-onDurationTimer is not started;

downlinkHARQ-FeedbackDisabled (optional): the configuration to enable HARQ feedback per DL HARQ process;

uplinkHARQ-Mode (optional): the configuration to set HARQmodeA or HARQmodeB per UL HARQ process.

Serving Cells of a MAC entity may be configured by RRC in two DRX groups with separate DRX parameters. When RRC does not configure a secondary DRX group, there is only one DRX group and all Serving Cells belong to that one DRX group. When two DRX groups are configured, each Serving Cell is uniquely assigned to either of the two groups. The DRX parameters that are separately configured for each DRX group are: drx-onDurationTimer, drx-InactivityTimer. The DRX parameters that are common to the DRX groups are: drx-SlotOffset, drx-RetransmissionTimerDL, drx-RetransmissionTimerUL, drx-LongCycleStartOffset, drx-ShortCycle (optional), drx-ShortCycleTimer (optional), drx-HARQ-RTT-TimerDL, drx-HARQ-RYJ-TimerUL, downlinkHARQ-FeedbackDisabled (optional) and uplinkHARQ-Mode (optional).

When DRX is configured, the Active Time for Serving Cells in a DRX group includes the time while:

drx-onDurationTimer or drx-InactivityTimer configured for the DRX group is running; or drx-RetransmissionTimerDL, drx-RetransmissionTimerUL or drx-RetransmissionTimerSL is running on any Serving Cell in the DRX group; or ra-ContentionResolutionTimer (as described in clause 5.1.5) or msgB-ResponseWindow (as described in clause 5.1.4a) is running; or a Scheduling Request is sent on PUCCH and is pending (as described in clause 5.4.4 or 5.22.1.5). If this Serving Cell is part of a non-terrestrial network, the Active Time is started after the Scheduling Request transmission that is performed when the SR_COUNTER is 0 for all the SR configurations with pending SR(s) plus the UE-gNB RTT; or a PDCCH indicating a new transmission addressed to the C-RNTI of the MAC entity has not been received after successful reception of a Random Access Response for the Random Access Preamble not selected by the MAC entity among the contention-based Random Access Preamble (as described in clauses 5.1.4 and 5.1.4a).

The following MAC timers are used for DRX operation in a non-terrestrial network:

HARQ-RTT-TimerDL-NTN (per DL HARQ process configured with HARQ feedback enabled): the minimum duration before a DL assignment for HARQ retransmission is expected by the MAC entity;

HARQ-RTT-TimerUL-NTN (per UL HARQ process configured with HARQModeA): the minimum duration before a UL HARQ retransmission grant is expected by the MAC entity.

When DRX is configured, the MAC entity shall:
1> if a MAC PDU is received in a configured downlink assignment for unicast:
  2> if this Serving Cell is configured with downlinkHARQ-FeedbackDisabled:
    3> if the corresponding HARQ process is configured with HARQ feedback enabled:
      4> set HARQ-RTT-TimerDL-NTN for the corresponding HARQ process equal to drx-HARQ-RTT-TimerDL plus the latest available UE-gNB RTT value;
      4> start the HARQ-RTT-TimerDL-NTN for the corresponding HARQ process in the first symbol after the end of the corresponding transmission carrying the DL HARQ feedback.
  2> else:
    3> start the drx-HARQ-RTT-TimerDL for the corresponding HARQ process in the first symbol after the end of the corresponding transmission carrying the DL HARQ feedback.
  NOTE 1a: Void.
  NOTE 1b: Void.
  2> stop the drx-RetransmissionTimerDL for the corresponding HARQ process;
  2> stop the drx-RetransmissionTimerDL-PTM for the corresponding HARQ process.
1> if a MAC PDU is transmitted in a configured uplink grant and LBT failure indication is not received from lower layers:
  2> if this Serving Cell is configured with uplinkHARQ-Mode:
    3> if the corresponding HARQ process is configured as HARQModeA:
      4> set HARQ-RTT-TimerUL-NTN for the corresponding HARQ process equal to drx-HARQ-RTT-TimerUL plus the latest available UE-gNB RTT value;
      4> if drx-LastTransmissionUL is configured:
        5> start the HARQ-RTT-TimerUL-NTN for the corresponding HARQ process in the first symbol after the end of the last transmission (within a bundle) of the corresponding PUSCH transmission.
      4> else:
        5> start the HARQ-RTT-TimerUL-NTN for the corresponding HARQ process in the first symbol after the end of the first transmission (within a bundle) of the corresponding PUSCH transmission.
  2> else:
    3> if drx-LastTransmissionUL is configured:
      4> start the drx-HARQ-RTT-TimerUL for the corresponding HARQ process in the first symbol after the end of the last transmission (within a bundle) of the corresponding PUSCH transmission.
    3> else:
      4> start the drx-HARQ-RTT-TimerUL for the corresponding HARQ process in the first symbol after the end of the first transmission (within a bundle) of the corresponding PUSCH transmission.
  2> stop the drx-RetransmissionTimerUL for the corresponding HARQ process at the first transmission (within a bundle) of the corresponding PUSCH transmission.
1> if a MAC PDU is transmitted in a configured sidelink grant:
  2> if the PUCCH resource is configured:
    3> start the drx-HARQ-RTT-TimerSL for the corresponding HARQ process in the first symbol after the end of the corresponding PUCCH transmission carrying the SL HARQ feedback; or
    3> start the drx-HARQ-RTT-TimerSL for the corresponding HARQ process in the first symbol after the end of the corresponding PUCCH resource for the SL HARQ feedback when the PUCCH is not transmitted;
    3> stop the drx-RetransmissionTimerSL for the corresponding HARQ process.
  2> else:
    3> start the drx-HARQ-RTT-TimerSL for the corresponding HARQ process at the first symbol after the end of the corresponding PSSCH transmission;
    3> stop the drx-RetransmissionTimerSL for the corresponding HARQ process.
1> if a drx-HARQ-RTT-TimerDL expires:
  2> if the data of the corresponding HARQ process was not successfully decoded:
    3> start the drx-RetransmissionTimerDL for the corresponding HARQ process in the first symbol after the expiry of drx-HARQ-RTT-TimerDL.
1> if a HARQ-RTT-TimerDL-NTN expires:
  2> if the data of the corresponding HARQ process was not successfully decoded:
    3> start the drx-RetransmissionTimerDL for the corresponding HARQ process in the first symbol after the expiry of HARQ-RTT-TimerDL-NTN.
1> if a drx-HARQ-RTT-TimerUL expires:
  2> start the drx-RetransmissionTimerUL for the corresponding HARQ process in the first symbol after the expiry of drx-HARQ-RTT-TimerUL.
1> if a HARQ-RTT-TimerUL-NTN expires:
  2> start the drx-RetransmissionTimerUL for the corresponding HARQ process in the first symbol after the expiry of HARQ-RTT-TimerUL-NTN.

1> if a drx-HARQ-RTT-TimerSL expires:
   2> if a HARQ NACK feedback for the corresponding HARQ process is transmitted on PUCCH; or
   2> if a HARQ NACK feedback for the corresponding HARQ process is not transmitted on PUCCH; or
   2> if the PUCCH resource is not configured for the SL grant:
      3> start the drx-RetransmissionTimerSL for the corresponding HARQ process in the first symbol after the expiry of drx-HARQ-RTT-TimerSL.
NOTE: The UE handles the drx-RetransmissionTimerSL operation when sl-PUCCH-Config is configured by RRC but PUCCH resource is not scheduled same as when sl-PUCCH-Config is not configured.
1> if a DRX Command MAC CE with DCI scrambled with C-RNTI for unicast transmission or a Long DRX Command MAC CE is received:
   2> stop drx-onDurationTimer for each DRX group;
   2> stop drx-InactivityTimer for each DRX group.
1> if drx-InactivityTimer for a DRX group expires:
   2> if the Short DRX cycle is configured:
      3> start or restart drx-ShortCycleTimer for this DRX group in the first symbol after the expiry of drx-InactivityTimer;
      3> use the Short DRX cycle for this DRX group.
   2> else:
      3> use the Long DRX cycle for this DRX group.
1> if a DRX Command MAC CE with DCI scrambled with C-RNTI for unicast transmission is received:
   2> if the Short DRX cycle is configured:
      3> start or restart drx-ShortCycle Timer for each DRX group in the first symbol after the end of DRX Command MAC CE reception;
      3> use the Short DRX cycle for each DRX group.
   2> else:
      3> use the Long DRX cycle for each DRX group.
1> if drx-ShortCycleTimer for a DRX group expires:
   2> use the Long DRX cycle for this DRX group.
1> if a Long DRX Command MAC CE is received:
   2> stop drx-ShortCycleTimer for each DRX group;
   2> use the Long DRX cycle for each DRX group.
1> if the Short DRX cycle is used for a DRX group, and [(SFN×10)+subframe number] modulo (drx-ShortCycle)=(drx-StartOffset) modulo (drx-ShortCycle):
   2> start drx-onDurationTimer for this DRX group after drx-SlotOffset from the beginning of the subframe.
1> if the Long DRX cycle is used for a DRX group, and [(SFN×10)+subframe number] modulo (drx-LongCycle)=drx-StartOffset:
   2> if DCP monitoring is configured for the active DL BWP as specified in TS 38.213 [6], clause 10.3:
      3> if DCP indication associated with the current DRX cycle received from lower layer indicated to start drx-onDurationTimer, as specified in TS 38.213 [6]; or
      3> if all DCP occasion(s) in time domain, as specified in TS 38.213 [6], associated with the current DRX cycle occurred in Active Time considering grants/assignments/DRX Command MAC CE/Long DRX Command MAC CE received and Scheduling Request sent until 4 ms prior to start of the last DCP occasion, or during a measurement gap, or when the MAC entity monitors for a PDCCH transmission on the search space indicated by recoverySearchSpaceId of the SpCell identified by the C-RNTI while the ra-ResponseWindow is running (as specified in clause 5.1.4); or
      3> if ps-Wakeup is configured with value true and DCP indication associated with the current DRX cycle has not been received from lower layers:
         4> start drx-onDurationTimer after drx-SlotOffset from the beginning of the subframe.
   2> else:
      3> start drx-onDurationTimer for this DRX group after drx-SlotOffset from the beginning of the subframe.
NOTE 2: In case of unaligned SFN across carriers in a cell group, the SFN of the SpCell is used to calculate the DRX duration.
1> if a DRX group is in Active Time:
   2> monitor the PDCCH on the Serving Cells in this DRX group as specified in TS 38.213 [6];
   2> if the PDCCH indicates a DL transmission; or
   2> if the PDCCH indicates a one-shot HARQ feedback as specified in clause 9.1.4 of TS 38.213 [6]; or
   2> if the PDCCH indicates a retransmission of HARQ feedback as specified in clause 9.1.5 of TS 38.213 [6]:
      3> if this Serving Cell is configured with downlinkHARQ-FeedbackDisabled:
         4> if the corresponding HARQ process is configured with HARQ feedback enabled:
            5> set HARQ-RTT-TimerDL-NTN for the corresponding HARQ process equal to drx-HARQ-RTT-TimerDL plus the latest available UE-gNB RTT value;
            5> start the HARQ-RTT-TimerDL-NTN for the corresponding HARQ process in the first symbol after the end of the corresponding transmission carrying the DL HARQ feedback.
      3> else:
         4> start or restart the drx-HARQ-RTT-TimerDL for the corresponding HARQ process(es) whose HARQ feedback is reported in the first symbol after the end of the corresponding transmission carrying the DL HARQ feedback.
NOTE 3: When HARQ feedback is postponed by PDSCH-to-HARQ_feedback timing indicating an inapplicable kl value, as specified in TS 38.213 [6], the corresponding transmission opportunity to send the DL HARQ feedback is indicated in a later PDCCH requesting the HARQ-ACK feedback.
      3> stop the drx-RetransmissionTimerDL for the corresponding HARQ process(es) whose HARQ feedback is reported;
      3> stop the drx-RetransmissionTimerDL-PTM for the corresponding HARQ process;
      3> if the PDSCH-to-HARQ_feedback timing indicate an inapplicable kl value as specified in TS 38.213 [6]:
         4> start the drx-RetransmissionTimerDL in the first symbol after the (end of the last) PDSCH transmission (within a bundle) for the corresponding HARQ process.
   2> if the PDCCH indicates a UL transmission:
      3> if this Serving Cell is configured with uplinkHARQ-Mode:
         4> if the corresponding HARQ process is configured as HARQModeA:

5> set HARQ-RTT-TimerUL-NTN for the corresponding HARQ process equal to drx-HARQ-RTT-TimerUL plus the latest available UE-gNB RTT value;
5> if drx-LastTransmissionUL is configured:
6> start the HARQ-RTT-TimerUL-NTN for the corresponding HARQ process in the first symbol after the end of the last transmission (within a bundle) of the corresponding PUSCH transmission.
5> else:
6> start the HARQ-RTT-TimerUL-NTN for the corresponding HARQ process in the first symbol after the end of the first transmission (within a bundle) of the corresponding PUSCH transmission.
3> else:
4> if drx-LastTransmissionUL is configured:
5> start the drx-HARQ-RTT-TimerUL for the corresponding HARQ process in the first symbol after the end of the last transmission (within a bundle) of the corresponding PUSCH transmission.
4> else:
5> start the drx-HARQ-RTT-TimerUL for the corresponding HARQ process in the first symbol after the end of the first transmission (within a bundle) of the corresponding PUSCH transmission.
3> stop the drx-RetransmissionTimerUL for the corresponding HARQ process.
2> if the PDCCH indicates an SL transmission:
3> if the PUCCH resource is configured:
4> start the drx-HARQ-RTT-TimerSL for the corresponding HARQ process in the first symbol after the end of the corresponding PUCCH transmission carrying the SL HARQ feedback; or
4> start the drx-HARQ-RTT-TimerSL for the corresponding HARQ process in the first symbol after the end of the corresponding PUCCH resource for the SL HARQ feedback when the PUCCH is not transmitted;
4> stop the drx-RetransmissionTimerSL for the corresponding HARQ process.
3> else:
4> start the drx-HARQ-RTT-TimerSL for the corresponding HARQ process at the first symbol after end of PDCCH occasion;
4> stop the drx-RetransmissionTimerSL for the corresponding HARQ process.
2> if the PDCCH indicates a new transmission (DL, UL or SL) on a Serving Cell in this DRX group:
3> start or restart drx-InactivityTimer for this DRX group in the first symbol after the end of the PDCCH reception.
NOTE 3a: A PDCCH indicating activation of SPS, configured grant type 2, or configured sidelink grant of configured grant Type 2 is considered to indicate a new transmission.
NOTE 3b: If the PDCCH reception includes two PDCCH candidates from corresponding search spaces, as described in clause 10.1 in 38.213, start or restart drx-InactivityTimer for this DRX group in the first symbol after the end of the PDCCH candidate that ends later in time.

2> if a HARQ process receives downlink feedback information and acknowledgement is indicated:
3> stop the drx-RetransmissionTimerUL for the corresponding HARQ process.

5.8 Transmission and Reception without Dynamic Scheduling 5.8.3 Sidelink

There are two types of transmission without dynamic sidelink grant:
configured grant Type 1 where an sidelink grant is provided by RRC, and stored as configured sidelink grant;
configured grant Type 2 where an sidelink grant is provided by PDCCH, and stored or cleared as configured sidelink grant based on L1 signalling indicating configured sidelink grant activation or deactivation.

Type 1 and/or Type 2 are configured with a single BWP. Multiple configurations of up to 8 configured grants (including both Type 1 and Type 2, if configured) can be active simultaneously on the BWP.

RRC configures the following parameters when the configured grant Type 1 is configured, as specified in TS 38.331 [5] or TS 36.331 [21]:
sl-ConfigIndexCG: the identifier of a configured grant for sidelink;
sl-CS-RNTI: SLCS-RNTI for retransmission;
sl-NrOfHARQ-Processes: the number of HARQ processes for configured grant;
sl-PeriodCG: periodicity of the configured grant Type 1;
sl-TimeOffsetCG-Type1: Offset of a resource with respect to reference logical slot defined by sl-TimeReferenceSFN-Type1 in time domain, referring to the number of logical slots in a resource pool;
sl-TimeResourceCG-Type1: time resource location of the configured grant Type 1;
sl-CG-MaxTransNumList: the maximum number of times that a TB can be transmitted using the configured grant;
sl-HARQ-ProcID-offset: offset of HARQ process for configured grant Type 1;
sl-TimeReferenceSFN-Type1: SFN used for determination of the offset of a resource in time domain. If it is present, the UE uses the first logical slot of associated resource pool after the starting time of the closest SFN with the indicated number preceding the reception of the sidelink configured grant configuration Type 1 as reference logical slot. If it is absent, the indicated reference SFN is zero.

RRC configures the following parameters when the configured grant Type 2 is configured, as specified in TS 38.331 [5]:
sl-ConfigIndexCG: the identifier of a configured grant for sidelink;
sl-CS-RNTI: SLCS-RNTI for activation, deactivation, and retransmission;
sl-NrOfHARQ-Processes: the number of HARQ processes for configured grant;
sl-PeriodCG: periodicity of the configured grant Type 2;
sl-CG-MaxTransNumList: the maximum number of times that a TB can be transmitted using the configured grant;
sl-HARQ-ProcID-offset: offset of HARQ process for configured grant Type 2.

Upon configuration of a configured grant Type 1, the MAC entity shall for each configured sidelink grant:
1> store the sidelink grant provided by RRC as a configured sidelink grant;
1> initialise or re-initialise the configured sidelink grant to determine PSCCH duration(s) and PSSCH duration(s) according to sl-TimeOffsetCG-Type1 and sl-TimeResourceCG-Type1, and to reoccur with sl-periodCG for transmissions of multiple MAC PDUs according to clause 8.1.2 of TS 38.214 [7].

NOTE 1: If the MAC entity is configured with multiple configured sidelink grants, collision among the configured sidelink grants may occur. How to handle the collision is left to UE implementation.

After a sidelink grant is configured for a configured grant Type 1, the MAC entity shall consider sequentially that the first slot of the $S^{th}$ sidelink grant occurs in the logical slot for which:

CURRENT_slot=(sl-ReferenceSlotCG-Type1+sl-TimeOffsetCG-Type1+S×PeriodicitySL)modulo $T'_{max}$ where CURRENT_slot refers to current logical slot in the associated resource pool, $$PeriodicitySL \left\lfloor \frac{T'_{max}}{10240 \text{ ms}} \times \text{sl-PeriodCG} \right\rfloor$$

and $T'_{max}$ is the number of slots that belongs to the associated resource pool as defined in 10240 ms clause 8 of TS 38.214[7]. sl-ReferenceSlotCG-Type1 refers to reference logical slot defined by sl-TimeReferenceSFN-Type1.

After a sidelink grant is configured for a configured grant Type 2, the MAC entity shall consider sequentially that the first slot of $S^{th}$ sidelink grant occurs in the logical slot for which:

CURRENT_slot=(sl-StartSlotCG-Type2+S×PeriodicitySL)modulo $T'_{max}$ where sl-StartSlotCG-Type2 refers to the logical slot of the first transmission opportunity of PSSCH where the configured sidelink grant was (re)initialised.

When a configured sidelink grant is released by RRC, all the corresponding configurations shall be released and all corresponding sidelink grants shall be cleared.

The MAC entity shall:
1> if the configured sidelink grant confirmation has been triggered and not cancelled; and
1> if the MAC entity has UL resources allocated for new transmission:
2> instruct the Multiplexing and Assembly procedure to generate a Sidelink Configured Grant Confirmation MAC CE as defined in clause 6.1.3.34;
2> cancel the triggered configured sidelink grant confirmation.

For a configured grant Type 2, the MAC entity shall clear the corresponding configured sidelink grant immediately after first transmission of Sidelink Configured Grant Confirmation MAC CE triggered by the configured sidelink grant deactivation.

5.22 SL-SCH Data Transfer
5.22.1 SL-SCH Data Transmission
5.22.1.1 SL Grant Reception and SCI Transmission Sidelink grant is received dynamically on the PDCCH, configured semi-persistently by RRC or autonomously selected by the MAC entity. The MAC entity shall have a sidelink grant on an active SL BWP to determine a set of PSCCH duration(s) in which transmission of SCI occurs and a set of PSSCH duration(s) in which transmission of SL-SCH associated with the SCI occurs. A sidelink grant addressed to SLCS-RNTI with NDI=1 is considered as a dynamic sidelink grant.

If the MAC entity has been configured with Sidelink resource allocation mode 1 as indicated in TS 38.331 [5], the MAC entity shall for each PDCCH occasion and for each grant received for this PDCCH occasion:

1> if a sidelink grant has been received on the PDCCH for the MAC entity's SL-RNTI:
2> if the NDI received on the PDCCH has not been toggled compared to the value in the previously received HARQ information for the HARQ Process ID:
3> use the received sidelink grant to determine PSCCH duration(s) and PSSCH duration(s) for one or more retransmissions of a single MAC PDU for the corresponding Sidelink process according to clause 8.1.2 of TS 38.214 [7].
2> else:
3> use the received sidelink grant to determine PSCCH duration(s) and PSSCH duration(s) for initial transmission and, if available, retransmission(s) of a single MAC PDU according to clause 8.1.2 of TS 38.214 [7].
2> if a sidelink grant is available for retransmission(s) of a MAC PDU which has been positively acknowledged as specified in clause 5.22.1.3.1a:
3> clear the PSCCH duration(s) and PSSCH duration(s) corresponding to retransmission(s) of the MAC PDU from the sidelink grant.
1> else if a sidelink grant has been received on the PDCCH for the MAC entity's SLCS-RNTI:
2> if PDCCH contents indicate retransmission(s) for the identified HARQ process ID that has been set for an activated configured sidelink grant identified by sl-ConfigIndexCG:
3> use the received sidelink grant to determine PSCCH duration(s) and PSSCH duration(s) for one or more retransmissions of a single MAC PDU according to clause 8.1.2 of TS 38.214 [7].
2> else if PDCCH contents indicate configured grant Type 2 deactivation for a configured sidelink grant:
3> trigger configured sidelink grant confirmation for the configured sidelink grant.
2> else if PDCCH contents indicate configured grant Type 2 activation for a configured sidelink grant:
3> trigger configured sidelink grant confirmation for the configured sidelink grant;
3> store the configured sidelink grant;
3> initialise or re-initialise the configured sidelink grant to determine the set of PSCCH durations and the set of PSSCH durations for transmissions of multiple MAC PDUs according to clause 8.1.2 of TS 38.214 [7].

If the MAC entity has been configured with Sidelink resource allocation mode 2 to transmit using pool(s) of resources in a carrier as indicated in TS 38.331 [5] or TS 36.331 [21] based on full sensing, or partial sensing, or random selection or any combination(s), the MAC entity shall for each Sidelink process:

NOTE 1: If the MAC entity is configured with Sidelink resource allocation mode 2 to transmit using a pool of resources in a carrier as indicated in TS 38.331 [5] or TS 36.331 [21], the MAC entity can create a selected sidelink grant on the pool of resources based on random selection, or partial sensing, or full sensing only after releasing configured sidelink grant(s), if any.

NOTE 2: The MAC entity expects that PSFCH is always configured by RRC for at least one pool of resources in sl-TxPoolSelectedNormal and for the resource pool in sl-TxPoolExceptional in case that at least a logical channel configured with sl-HARQ-FeedbackEnabled is set to enabled.

NOTE 2A: For the transmission of Sidelink Inter-UE Coordination Request MAC CE, the MAC entity selects the TX pool of resource where the IUC resource set is required. For the transmission of Sidelink Inter-UE Coordination Information MAC CE, the MAC entity selects the TX pool of resource where the IUC resource set is located.

1> if the MAC entity has selected to create a selected sidelink grant corresponding to transmissions of multiple MAC PDUs, and SL data is available in a logical channel:
  2> if the MAC entity has not selected a pool of resources allowed for the logical channel:
    3> if SL data is available in the logical channel for $N_R$ sidelink discovery:
      4> if sl-BWP-DiscPoolConfig or sl-BWP-DiscPoolConfigCommon is configured according to TS 38.331 [5]:
        5> select the sl-DiscTxPoolSelected configured in sl-BWP-DiscPoolConfig or sl-BWP-DiscPoolConfigCommon for the transmission of $N_R$ sidelink discovery message.
      4> else:
        5> select any pool of resources among the configured pools of resources.
    3> else if sl-HARQ-FeedbackEnabled is set to enabled for the logical channel:
      4> select any pool of resources configured with PSFCH resources among the pools of resources except the pool(s) in sl-BWP-DiscPoolConfig or sl-BWP-DiscPoolConfigCommon, if configured.
    3> else:
      4> select any pool of resources among the pools of resources except the pool(s) in sl-BWP-DiscPoolConfig or sl-BWP-DiscPoolConfigCommon, if configured.
  2> perform the TX resource (re-)selection check on the selected pool of resources as specified in clause 5.22.1.2;

NOTE 3: The MAC entity continuously performs the TX resource (re-)selection check until the corresponding pool of resources is released by RRC or the MAC entity decides to cancel creating a selected sidelink grant corresponding to transmissions of multiple MAC PDUs.

2> if the TX resource (re-)selection is triggered as the result of the TX resource (re-)selection check:
    3> if one or multiple SL DRX(s) is configured in the destination UE(s) receiving SL-SCH data:
      4> indicate to the physical layer SL DRX Active time in the destination UE(s) receiving SL-SCH data, as specified in clause 5.28.2.
    3> select one of the allowed values configured by RRC in sl-ResourceReservePeriodList and set the resource reservation interval, $P_{rsvp\_TX}$, with the selected value;

NOTE 3A: The MAC entity selects a value for the resource reservation interval which is larger than the remaining PDB of SL data available in the logical channel.

3> randomly select, with equal probability, an integer value in the interval [5, 15] for the resource reservation interval higher than or equal to 100 ms or in the interval $$\left[5 \times \left\lceil \frac{100}{\max(20, P_{rsvp\_TX})} \right\rceil, 15 \times \left\lceil \frac{100}{\max(20, P_{rsvp\_TX})} \right\rceil \right]$$

for the resource reservation interval lower than 100 ms and set SL_RESOURCE_RESELECTION_COUNTER to the selected value;
    3> select the number of HARQ retransmissions from the allowed numbers, if configured by RRC, in sl-MaxTxTransNumPSSCH included in sl-PSSCH-TxConfigList and, if configured by RRC, overlapped in sl-MaxTxTransNumPSSCH indicated in sl-CBR-PriorityTxConfigList for the highest priority of the logical channel(s) allowed on the carrier and the CBR measured by lower layers according to clause 5.1.27 of TS 38.215 [24] if CBR measurement results are available or the corresponding sl-defaultTxConfigIndex configured by RRC if CBR measurement results are not available;
    3> select an amount of frequency resources within the range, if configured by RRC, between sl-MinSubChannelNumPSSCH and sl-MaxSubchannelNumPSSCH included in sl-PSSCH-TxConfigList and, if configured by RRC, overlapped between MinSubChannelNumPSSCH and MaxSubchannelNumPSSCH indicated in sl-CBR-PriorityTxConfigList for the highest priority of the logical channel(s) allowed on the carrier and the CBR measured by lower layers according to clause 5.1.27 of TS 38.215 [24] if CBR measurement results are available or the corresponding sl-defaultTxConfigIndex configured by RRC if CBR measurement results are not available;
    3> if sl-InterUE-CoordinationScheme1 enabling reception/transmission of preferred resource set and non-preferred resource set is not configured by RRC:
      4> if transmission based on random selection is configured by upper layers:
        5> randomly select the time and frequency resources for one transmission opportunity from the resource pool which occur within the SL DRX Active time as specified in clause 5.28.2 of the destination UE selected for indicating to the physical layer the SL DRX Active time above, according to the amount of selected frequency resources and the remaining PDB of SL data available in the logical channel(s) allowed on the carrier.
      4> else:
        5> randomly select the time and frequency resources for one transmission opportunity from the resources indicated by the physical layer as specified in clause 8.1.4 of TS 38.214 [7] which occur within the SL DRX Active time as specified in clause 5.28.2 of the destination UE selected for indicating to the physical layer the SL DRX Active time above, according to the amount of selected frequency resources and the remaining PDB of SL data available in the logical channel(s) allowed on the carrier.

3> if sl-InterUE-CoordinationScheme1 enabling reception/transmission of preferred resource set and non-preferred resource set is configured by RRC and neither preferred resource set nor non-preferred resource set is received from a UE:
    4> if transmission based on random selection is configured by upper layers:
        5> randomly select the time and frequency resources for one transmission opportunity from the resources pool, according to the amount of selected frequency resources and the remaining PDB of SL data available in the logical channel(s) allowed on the carrier.
    4> else:
        5> randomly select the time and frequency resources for one transmission opportunity from the resources indicated by the physical layer as specified in clause 8.1.4 of TS 38.214 [7], according to the amount of selected frequency resources and the remaining PDB of SL data available in the logical channel(s) allowed on the carrier.
3> if sl-InterUE-CoordinationScheme1 enabling reception/transmission of preferred resource set and non-preferred resource set is configured by RRC and when the UE does not have own sensing result as specified in clause 8.1.4 of TS 38.214 [7] and if a preferred resource set is received from a UE:
    4> randomly select the time and frequency resources for one transmission opportunity from the resources belonging to the received preferred resource set for SL-SCH data to be transmitted to the UE providing the preferred resource set, according to the amount of selected frequency resources and the remaining PDB of SL data available in the logical channel(s) allowed on the carrier.
3> if sl-InterUE-CoordinationScheme1 enabling reception/transmission of preferred resource set and non-preferred resource set is configured by RRC and when the UE has own sensing result as specified in clause 8.1.4 of TS 38.214 [7] and if a preferred resource set is received from a UE:
    4> randomly select the time and frequency resources for one transmission opportunity within the intersection of the received preferred resource set and the resources indicated by the physical layer as specified in clause 8.1.4 of TS 38.214 [7] for an SL-SCH data to be transmitted to the UE providing the preferred resource set, according to the amount of selected frequency resources and the remaining PDB of SL data available in the logical channel(s) allowed on the carrier.
    4> if there are no resources within the intersection that can be selected as the time and frequency resources for the one transmission opportunity according to the amount of selected frequency resources and the remaining PDB of SL data available in the logical channel(s) allowed on the carrier.
        5> randomly select the time and frequency resources for one transmission opportunity from the resources indicated by the physical layer as specified in clause 8.1.4 of TS 38.214 [7], according to the amount of selected frequency resources and the remaining PDB of SL data available in the logical channel(s) allowed on the carrier.
3> use the randomly selected resource to select a set of periodic resources spaced by the resource reservation interval for transmissions of PSCCH and PSSCH corresponding to the number of transmission opportunities of MAC PDUs determined in TS 38.214 [7].
3> if sl-InterUE-CoordinationScheme1 enabling reception/transmission of preferred resource set and non-preferred resource set is configured by RRC and when the UE has own sensing result as specified in clause 8.1.4 of TS 38.214 [7] and if a non-preferred resource set is received from a UE:
    4> indicate the received non-preferred resource set to physical layer.
3> if one or more HARQ retransmissions are selected:
    4> if sl-InterUE-CoordinationScheme1 enabling reception/transmission of preferred resource set and non-preferred resource set is not configured by RRC:
        5> if transmission based on full sensing or partial sensing is configured by upper layers and there are available resources left in the resources indicated by the physical layer according to clause 8.1.4 of TS 38.214 [7] for more transmission opportunities; or
        5> if transmission based on random selection is configured by upper layers and there are available resources left in the resource pool for more transmission opportunities:
            6> randomly select the time and frequency resources for one or more transmission opportunities from the available resources which occur within the SL DRX Active time as specified in clause 5.28.2 of the destination UE selected for indicating to the physical layer the SL DRX Active time above, according to the amount of selected frequency resources, the selected number of HARQ retransmissions and the remaining PDB of SL data available in the logical channel(s) allowed on the carrier by ensuring the minimum time gap between any two selected resources in case that PSFCH is configured for this pool of resources and that a retransmission resource can be indicated by the time resource assignment of a prior SCI according to clause 8.3.1.1 of TS 38.212 [9].
    4> if sl-InterUE-CoordinationScheme1 enabling reception/transmission of preferred resource set is configured by RRC and non-preferred resource set and neither preferred resource set nor non-preferred resource set is received from a UE:
        5> if transmission based on full sensing or partial sensing is configured by upper layers and there are available resources left in the resources indicated by the physical layer according to clause 8.1.4 of TS 38.214 [7] for more transmission opportunities; or
        5> if transmission based on random selection is configured by upper layers and there are available resources left in the resource pool for more transmission opportunities:
            6> randomly select the time and frequency resources for one or more transmission opportunities from the available resources, according to the amount of selected frequency resources, the selected number of HARQ retransmissions and the remaining PDB of SL data available in the logical channel(s) allowed on the carrier by ensuring the minimum time gap between any two selected resources in case that PSFCH is configured for this pool of resources and that a retransmission resource can be indicated by the time resource assignment of a prior SCI according to clause 8.3.1.1 of TS 38.212 [9].

4> if sl-InterUE-CoordinationScheme1 enabling reception/transmission of preferred resource set and non-preferred resource set is configured by RRC and when the UE has own sensing result as specified in clause 8.1.4 of TS 38.214 [7] and if a preferred resource set is received from a UE; and 4> if there are available resources left in the intersection of the received preferred resource set and the resources indicated by the physical layer as specified in clause 8.1.4 of TS 38.214 [7] for more transmission opportunities:

5> randomly select the time and frequency resources for one or more transmission opportunities from the available resources within the intersection for SL-SCH data to be transmitted to the UE providing the preferred resource set, according to the amount of selected frequency resources, the selected number of HARQ retransmissions and the remaining PDB of SL data available in the logical channel(s) allowed on the carrier by ensuring the minimum time gap between any two selected resources in case that PSFCH is configured for this pool of resources and that a retransmission resource can be indicated by the time resource assignment of a prior SCI according to clause 8.3.1.1 of TS 38.212 [9];

5> if the number of time and frequency resources that has been maximally selected for one or more transmission opportunities from the available resources within the intersection is smaller than the selected number of HARQ retransmissions:

6> randomly select the time and frequency resources for the remaining transmission opportunities except for the selected resources within the intersection from the available resources outside the intersection but left in the resources indicated by the physical layer according to clause 8.1.4 of TS 38.214 [7], according to the amount of selected frequency resources, the selected number of HARQ retransmissions and the remaining PDB of SL data available in the logical channel(s) allowed on the carrier by ensuring the minimum time gap between any two selected resources in case that PSFCH is configured for this pool of resources and that a retransmission resource can be indicated by the time resource assignment of a prior SCI according to clause 8.3.1.1 of TS 38.212 [9].

4> if sl-InterUE-CoordinationScheme1 enabling reception/transmission of preferred resource set and non-preferred resource set is configured by RRC and when the UE does not have own sensing result as specified in clause 8.1.4 of TS 38.214 [7] and if a preferred resource set is received from a UE; and 4> if there are available resources left in the received preferred resource set for more transmission opportunities:

5> randomly select the time and frequency resources for one or more transmission opportunities from the available resources belonging to the received preferred resource set for SL-SCH data to be transmitted to the UE providing the preferred resource set, according to the amount of selected frequency resources, the selected number of HARQ retransmissions and the remaining PDB of SL data available in the logical channel(s) allowed on the carrier by ensuring the minimum time gap between any two selected resources in case that PSFCH is configured for this pool of resources and that a retransmission resource can be indicated by the time resource assignment of a prior SCI according to clause 8.3.1.1 of TS 38.212 [9].

4> use the randomly selected resource to select a set of periodic resources spaced by the resource reservation interval for transmissions of PSCCH and PSSCH corresponding to the number of retransmission opportunities of the MAC PDUs determined in TS 38.214 [7];

4> consider the first set of transmission opportunities as the initial transmission opportunities and the other set(s) of transmission opportunities as the retransmission opportunities;

4> consider the sets of initial transmission opportunities and retransmission opportunities as the selected sidelink grant;

4> if sl-InterUE-CoordinationScheme1 enabling reception/transmission of preferred resource set and non-preferred resource set is configured by RRC and when the UE has own sensing result as specified in clause 8.1.4 of TS 38.214 [7] and if a non-preferred resource set is received from a UE:

5> indicate the received non-preferred resource set to physical layer.

3> else:

4> consider the set as the selected sidelink grant.

3> use the selected sidelink grant to determine the set of PSCCH durations and the set of PSSCH durations according to TS 38.214 [7].

2> else if SL_RESOURCE_RESELECTION_ COUNTER=0 and when SL_RESOURCE_RESELECTION_ COUNTER was equal to 1 the MAC entity randomly selected, with equal probability, a value in the interval [0, 1] which is less than or equal to the probability configured by RRC in sl-ProbResourceKeep:

3> clear the selected sidelink grant, if available;

3> randomly select, with equal probability, an integer value in the interval [5, 15] for the resource reservation interval higher than or equal to 100 ms or in the interval $$\left[ 5 \times \left\lceil \frac{100}{\max(20, P_{rsvp\_TX})} \right\rceil, 15 \times \left\lceil \frac{100}{\max(20, P_{rsvp\_TX})} \right\rceil \right]$$

for the resource reservation interval lower than 100 ms and set SL_RESOURCE_RESELECTION_ COUNTER to the selected value;

3> reuse the previously selected sidelink grant for the number of transmissions of the MAC PDUs determined in TS 38.214 [7] with the resource reservation interval to determine the set of PSCCH durations and the set of PSSCH durations according to TS 38.214 [7].
1> if the MAC entity has selected to create a selected sidelink grant corresponding to transmission(s) of a single MAC PDU, and if SL data is available in a logical channel, or an SL-CSI reporting is triggered, or a Sidelink DRX Command indication is triggered or a Sidelink Inter-UE Coordination Information reporting is triggered, or a Sidelink Inter-UE Coordination Request is triggered:
  2> if SL data is available in the logical channel for $N_R$ sidelink discovery:
    3> if sl-BWP-DiscPoolConfig or sl-BWP-DiscPoolConfigCommon is configured according to TS 38.331 [5]:
      4> select the sl-DiscTxPoolSelected configured in sl-BWP-DiscPoolConfig or sl-BWP-DiscPoolConfigCommon for the transmission of $N_R$ sidelink discovery message.
    3> else:
      4> select any pool of resources among the configured pools of resources.
  2> else if SL data for $N_R$ sidelink communication is available in the logical channel:
    3> if sl-HARQ-FeedbackEnabled is set to enabled for the logical channel:
      4> select any pool of resources configured with PSFCH resources among the pools of resources except the pool(s) in sl-BWP-DiscPoolConfig or sl-BWP-DiscPoolConfigCommon, if configured.
    3> else:
      4> select any pool of resources among the pools of resources except the pool(s) in sl-BWP-DiscPoolConfig or sl-BWP-DiscPoolConfigCommon, if configured.
  2> else if an SL-CSI reporting or a Sidelink DRX Command or a Sidelink Inter-UE Coordination Request or a Sidelink Inter-UE Coordination Information is triggered:
    3> select any pool of resources among the pools of resources except the pool(s) in sl-BWP-DiscPoolConfig or sl-BWP-DiscPoolConfigCommon, if configured.
  2> perform the TX resource (re-)selection check on the selected pool of resources as specified in clause 5.22.1.2;
  2> if the TX resource (re-)selection is triggered as the result of the TX resource (re-)selection check:
    3> if one or multiple SL DRX(s) is configured in the destination UE(s) receiving SL-SCH data:
      4> indicate to the physical layer SL DRX Active time in the destination UE(s) receiving SL-SCH data, as specified in clause 5.28.2.
    3> select the number of HARQ retransmissions from the allowed numbers, if configured by RRC, in sl-MaxTxTransNumPSSCH included in sl-PSSCH-TxConfigList and, if configured by RRC, overlapped in sl-MaxTxTransNumPSSCH indicated in sl-CBR-PriorityTxConfigList for the highest priority of the logical channel(s) allowed on the carrier and the CBR measured by lower layers according to clause 5.1.27 of TS 38.215 [24] if CBR measurement results are available or the corresponding sl-defaultTxConfigIndex configured by RRC if CBR measurement results are not available;
    3> select an amount of frequency resources within the range, if configured by RRC, between sl-MinSubChannelNumPSSCH and sl-MaxSubChannelNumPSSCH included in sl-PSSCH-TxConfigList and, if configured by RRC, overlapped between sl-MinSubChannelNumPSSCH and sl-MaxSubChannelNumPSSCH indicated in sl-CBR-PriorityTxConfigList for the highest priority of the logical channel(s) allowed on the carrier and the CBR measured by lower layers according to clause 5.1.27 of TS 38.215 [24] if CBR measurement results are available or the corresponding sl-defaultTxConfigIndex configured by RRC if CBR measurement results are not available;
    3> if sl-InterUE-CoordinationScheme1 enabling reception/transmission of preferred resource set and non-preferred resource set is not configured by RRC:
      4> if transmission based on random selection is configured by upper layers:
        5> randomly select the time and frequency resources for one transmission opportunity from the resources pool which occur within the SL DRX Active time as specified in clause 5.28.2 of the destination UE selected for indicating to the physical layer the SL DRX Active time above, according to the amount of selected frequency resources and the remaining PDB of SL data available in the logical channel(s) allowed on the carrier, and the latency requirement of the triggered SL CSI reporting.
      4> else:
        5> randomly select the time and frequency resources for one transmission opportunity from the resources indicated by the physical layer as specified in clause 8.1.4 of TS 38.214 [7] which occur within the SL DRX Active time as specified in clause 5.28.2 of the destination UE selected for indicating to the physical layer the SL DRX Active time above, according to the amount of selected frequency resources and the remaining PDB of SL data available in the logical channel(s) allowed on the carrier, and/or the latency requirement of the triggered SL-CSI reporting.
    3> if sl-InterUE-CoordinationScheme1 enabling reception/transmission of preferred resource set and non-preferred resource set is configured by RRC and neither preferred resource set nor non-preferred resource set is received from a UE:
      4> if transmission based on random selection is configured by upper layers:
        5> randomly select the time and frequency resources for one transmission opportunity from the resources pool, according to the amount of selected frequency resources and the remaining PDB of SL data available in the logical channel(s) allowed on the carrier, and/or the latency requirement of the triggered SL CSI reporting.

4> else:
  5> randomly select the time and frequency resources for one transmission opportunity from the resources indicated by the physical layer as specified in clause 8.1.4 of TS 38.214 [7], according to the amount of selected frequency resources and the remaining PDB of SL data available in the logical channel(s) allowed on the carrier, and/or the latency requirement of the triggered SL CSI reporting.
3> if sl-InterUE-CoordinationScheme1 enabling reception/transmission of preferred resource set and non-preferred resource set is configured by RRC and when the UE does not have own sensing result as specified in clause 8.1.4 of TS 38.214 [7] and if a preferred resource set is received from a UE:
  4> randomly select the time and frequency resources for one transmission opportunity from the resources belonging to the received preferred resource set for a MAC PDU to be transmitted to the UE providing the preferred resource set, according to the amount of selected frequency resources and the remaining PDB of SL data available in the logical channel(s) allowed on the carrier, and/or the latency requirement of the triggered SL CSI reporting.
3> if sl-InterUE-CoordinationScheme1 enabling reception/transmission of preferred resource set and non-preferred resource set is configured by RRC and when the UE has own sensing result as specified in clause 8.1.4 of TS 38.214 [7] and if a preferred resource set is received from a UE:
  4> randomly select the time and frequency resources for one transmission opportunity within the intersection of the received preferred resource set and the resources indicated by the physical layer as specified in clause 8.1.4 of TS 38.214 [7] for a MAC PDU to be transmitted to the UE providing the preferred resource set, according to the amount of selected frequency resources and the remaining PDB of SL data available in the logical channel(s) allowed on the carrier, and/or the latency requirement of the triggered SL CSI reporting;
  4> if there are no resources within the intersection that can be selected as the time and frequency resources for the one transmission opportunity according to the amount of selected frequency resources and the remaining PDB of SL data available in the logical channel(s) allowed on the carrier.
    5> randomly select the time and frequency resources for one transmission opportunity from the resources indicated by the physical layer as specified in clause 8.1.4 of TS 38.214 [7], according to the amount of selected frequency resources and the remaining PDB of SL data available in the logical channel(s) allowed on the carrier, and/or the latency requirement of the triggered SL CSI reporting.
3> if sl-InterUE-CoordinationScheme1 enabling reception/transmission of preferred resource set and non-preferred resource set is configured by RRC and when the UE has own sensing result as specified in clause 8.1.4 of TS 38.214 [7] and if a non-preferred resource set is received from a UE:
  4> indicate the received non-preferred resource set to physical layer.
3> if sl-InterUE-CoordinationScheme1 enabling reception/transmission of preferred resource set and non-preferred resource set is configured by RRC and when the UE determines the resources for Sidelink Inter-UE Coordination Information transmission upon explicit request from a UE:
  4> randomly select the time and frequency resources for one transmission opportunity from the resources indicated by the physical layer as specified in clause 8.1.4 of TS 38.214 [7], according to the amount of selected frequency resources, the remaining PDB of SL data available in the logical channel(s) allowed on the carrier, and/or the latency requirement of the triggered SL-CSI and the latency requirement of the Sidelink Inter-UE Coordination Information transmission.
3> if one or more HARQ retransmissions are selected:
  4> if sl-InterUE-CoordinationScheme1 enabling reception/transmission of preferred resource set and non-preferred resource set is not configured by RRC:
    5> if transmission based on full sensing or partial sensing is configured by upper layers and there are available resources left in the resources indicated by the physical layer according to clause 8.1.4 of TS 38.214 [7] for more transmission opportunities; or
    5> if transmission based on random selection is configured by upper layers and there are available resources left in the resources pool for more transmission opportunities:
      6> randomly select the time and frequency resources for one or more transmission opportunities from the available resources which occur within the SL DRX Active time as specified in clause 5.28.2 of the destination UE selected for indicating to the physical layer the SL DRX Active time above, according to the amount of selected frequency resources, the selected number of HARQ retransmissions and the remaining PDB of SL data available in the logical channel(s) allowed on the carrier, and/or the latency requirement of the triggered SL-CSI by ensuring the minimum time gap between any two selected resources in case that PSFCH is configured for this pool of resources, and that a retransmission resource can be indicated by the time resource assignment of a prior SCI according to clause 8.3.1.1 of TS 38.212 [9];
  4> if sl-InterUE-CoordinationScheme1 enabling reception/transmission of preferred resource set and non-preferred resource set is configured by RRC and neither preferred resource set nor non-preferred resource set is received from a UE:
    5> if transmission based on sensing is configured by upper layers and there are available resources left in the resources indicated by the physical layer according to clause 8.1.4 of TS 38.214 [7] for more transmission opportunities; or 5> if transmission based on random selection is configured by upper layers and there are available resources left in the resource pool for more transmission opportunities:
6> randomly select the time and frequency resources for one or more transmission opportunities from the available resources, according to the amount of selected frequency resources, the selected number of HARQ retransmissions and the remaining PDB of SL data available in the logical channel(s) allowed on the carrier, and/or the latency requirement of the triggered SL-CSI by ensuring the minimum time gap between any two selected resources in case that PSFCH is configured for this pool of resources and that a retransmission resource can be indicated by the time resource assignment of a prior SCI according to clause 8.3.1.1 of TS 38.212 [9].
4> if sl-InterUE-CoordinationScheme1 enabling reception/transmission of preferred resource set and non-preferred resource set is configured by RRC and when the UE has own sensing result as specified in clause 8.1.4 of TS 38.214 [7] and if a preferred resource set is received from a UE; and
4> if there are available resources left in the intersection of the received preferred resource set and the resources indicated by the physical layer as specified in clause 8.1.4 of TS 38.214 [7] for more transmission opportunities:
5> randomly select the time and frequency resources for one or more transmission opportunities from the available resources within the intersection for a MAC PDU to be transmitted to the UE providing the preferred resource set, according to the amount of selected frequency resources, the selected number of HARQ retransmissions and the remaining PDB of SL data available in the logical channel(s) allowed on the carrier, and/or the latency requirement of the triggered SL-CSI by ensuring the minimum time gap between any two selected resources in case that PSFCH is configured for this pool of resources and that a retransmission resource can be indicated by the time resource assignment of a prior SCI according to clause 8.3.1.1 of TS 38.212 [9];
5> if the number of time and frequency resources that has been maximally selected for one or more transmission opportunities from the available resources within the intersection is smaller than the selected number of HARQ retransmissions:
6> randomly select the time and frequency resources for the remaining transmission opportunities except for the selected resources within the intersection from the available resources outside the intersection but left in the resources indicated by the physical layer according to clause 8.1.4 of TS 38.214 [7], according to the amount of selected frequency resources, the selected number of HARQ retransmissions and the remaining PDB of SL data available in the logical channel(s) allowed on the carrier, and/or the latency requirement of the triggered SL-CSI by ensuring the minimum time gap between any two selected resources in case that PSFCH is configured for this pool of resources and that a retransmission resource can be indicated by the time resource assignment of a prior SCI according to clause 8.3.1.1 of TS 38.212 [9].
4> if sl-InterUE-CoordinationScheme1 enabling reception/transmission of preferred resource set and non-preferred resource set is configured by RRC and when the UE does not have own sensing result as specified in clause 8.1.4 of TS 38.214 [7] and if a preferred resource set is received from a UE; and
4> if there are available resources left in the received preferred resource set for more transmission opportunities:
5> randomly select the time and frequency resources for one or more transmission opportunities from the available resources belonging to the received preferred resource set for a MAC PDU to be transmitted to the UE providing the preferred resource set, according to the amount of selected frequency resources, the selected number of HARQ retransmissions and the remaining PDB of SL data available in the logical channel(s) allowed on the carrier, and/or the latency requirement of the triggered SL-CSI by ensuring the minimum time gap between any two selected resources in case that PSFCH is configured for this pool of resources and that a retransmission resource can be indicated by the time resource assignment of a prior SCI according to clause 8.3.1.1 of TS 38.212 [9].
4> if sl-InterUE-CoordinationScheme1 enabling reception/transmission of preferred resource set and non-preferred resource set is configured by RRC and when the UE has own sensing result as specified in clause 8.1.4 of TS 38.214 [7] and if a non-preferred resource set is received from a UE:
5> indicate the received non-preferred resource set to physical layer.
4> if sl-InterUE-CoordinationScheme1 enabling reception/transmission of preferred resource set and non-preferred resource set is configured by RRC and when the UE determines the resources for Sidelink Inter-UE Coordination Information transmission upon explicit request from a UE:
5> randomly select the time and frequency resources for one transmission opportunity from the resources indicated by the physical layer as specified in clause 8.1.4 of TS 38.214 [7], according to the amount of selected frequency resources, the remaining PDB of SL data available in the logical channel(s) allowed on the carrier, and/or the latency requirement of the triggered SL-CSI and the latency requirement of the Sidelink Inter-UE Coordination Information transmission.
4> consider a transmission opportunity which comes first in time as the initial transmission opportunity and other transmission opportunities as the retransmission opportunities;
4> consider all the transmission opportunities as the selected sidelink grant.

3> else:
   4> consider the set as the selected sidelink grant.
3> use the selected sidelink grant to determine PSCCH duration(s) and PSSCH duration(s) according to TS 38.214 [7].

NOTE 3A1: If sl-InterUE-CoordinationScheme1 enabling reception/transmission of preferred resource set and non-preferred resource set is configured by RRC and if multiple preferred resource sets are received from the same UE, it is up to UE implementation to use one or multiple of them in its resource (re)selection.

NOTE 3B1: If retransmission resource(s) cannot be selected by ensuring that the resource(s) can be indicated by the time resource assignment of a prior SCI, how to select the time and frequency resources for one or more transmission opportunities from the available resources is left for UE implementation by ensuring the minimum time gap between any two selected resources in case that PSFCH is configured for this pool of resources.

NOTE 3B2: When UE-B receives both a single preferred resource set and a single non-preferred resource set from the same UE-A or different UE-As, when UE-B has own sensing results, it is up to UE-B implementation to use the preferred resource set in its resource (re)selection for transmissions to the UE A providing the preferred resource set.

NOTE 3B3: The UE is not required to use any resource from the preferred resource set in its resource (re-)selection if that resource is earlier than $(T_{proc,0}^{SL}+T_{proc,1}^{SL}+T_{proc,2}^{SL})$ after the resource of inter-UE coordination information transmission, where $T_{proc,2}^{SL}$ is equal to $(T_{proc,0}^{SL}+T_{proc,1}^{SL})$ when only MAC CE is used for inter-UE coordination information transmission, or $T_{proc,2}^{SL}$ is equal to $T_{proc,0}^{SL}$ when MAC CE and SCI format 2-C are both used for inter-UE coordination information transmission and SCI format 2-C is received. $T_{proc,0}^{SL}$ and $T_{proc,1}^{SL}$ are specified in clause 8.1.4 of TS 38.214 [7].

1> if a selected sidelink grant is available for retransmission(s) of a MAC PDU which has been positively acknowledged as specified in clause 5.22.1.3.3:
   2> clear the PSCCH duration(s) and PSSCH duration(s) corresponding to retransmission(s) of the MAC PDU from the selected sidelink grant.

NOTE 3C: How the MAC entity determines the remaining PDB of SL data is left to UE implementation.

For a selected sidelink grant, the minimum time gap between any two selected resources comprises:
   a time gap between the end of the last symbol of a PSSCH transmission of the first resource and the start of the first symbol of the corresponding PSFCH reception determined by sl-MinTimeGapPSFCH and sl-PSFCH-Period for the pool of resources; and
   a time required for PSFCH reception and processing plus sidelink retransmission preparation including multiplexing of necessary physical channels and any TX-RX/RX-TX switching time.

NOTE: How to determine the time required for PSFCH reception and processing plus sidelink retransmission preparation is left to UE implementation.

The MAC entity shall for each PSSCH duration:
1> for each sidelink grant occurring in this PSSCH duration:
   2> select a MCS table allowed in the pool of resource which is associated with the sidelink grant;

NOTE 4a: MCS table selection is up to UE implementation if more than one MCS table is configured.
   2> if the MAC entity has been configured with Sidelink resource allocation mode 1:
      3> select a MCS which is, if configured, within the range that is configured by RRC between sl-MinMCS-PSSCH and sl-MaxMCS-PSSCH associated with the selected MCS table included in sl-ConfigDedicatedNR;
      3> set the resource reservation interval to 0ms.
   2> else:
      3> select a MCS which is, if configured, within the range, if configured by RRC, between sl-MinMCS-PSSCH and sl-MaxMCS-PSSCH associated with the selected MCS table included in sl-PSSCH-TxConfigList and, if configured by RRC, overlapped between sl-MinMCS-PSSCH and sl-MaxMCS-PSSCH associated with the selected MCS table indicated in sl-CBR-PriorityTxConfigList for the highest priority of the sidelink logical channel(s) in the MAC PDU and the CBR measured by lower layers according to clause 5.1.27 of TS 38.215 [24] if CBR measurement results are available or the corresponding sl-defaultTxConfigIndex configured by RRC if CBR measurement results are not available;
      3> if the MAC entity decides not to use the selected sidelink grant for the next PSSCH duration corresponding to an initial transmission opportunity:
         4> set the resource reservation interval to 0ms.
      3> else:
         4> set the resource reservation interval to the selected value.

NOTE 5: MCS selection is up to UE implementation if the MCS or the corresponding range is not configured by RRC.
   2> if the configured sidelink grant has been activated and this PSSCH duration corresponds to the first PSSCH transmission opportunity within this sl-PeriodCG of the configured sidelink grant:
      3> set the HARQ Process ID to the HARQ Process ID associated with this PSSCH duration and, if available, all subsequent PSSCH duration(s) occurring in this sl-PeriodCG for the configured sidelink grant;
      3> determine that this PSSCH duration is used for initial transmission;
      3> flush the HARQ buffer of Sidelink process associated with the HARQ Process ID.
   2> deliver the sidelink grant, the selected MCS, and the associated HARQ information to the Sidelink HARQ Entity for this PSSCH duration.

For configured sidelink grants, the HARQ Process ID associated with the first slot of an SL transmission is derived from the following equation:

HARQ Process ID=[floor(CURRENT_slot/PeriodicitySL)] modulo sl-NrOfHARQ-Processes+sl-HARQ-ProcID-offset where CURRENT_slot refers to current logical slot in the associated resource pool, and PeriodicitySL is defined in clause 5.8.3.

5.22.1.2 TX Resource (Re-)Selection Check

If the TX resource (re-)selection check procedure is triggered on the selected pool of resources for a Sidelink process according to clause 5.22.1.1, the MAC entity shall for the Sidelink process:

1> if PSCCH duration(s) and $2^{nd}$ stage SCI on PSSCH for all transmissions of a MAC PDU of any selected sidelink grant(s) are not in SL DRX Active time as specified in clause 5.28.3 of the destination that has data to be sent; or
1> if SL_RESOURCE_RESELECTION_COUNTER=0 and when SL_RESOURCE_RESELECTION_ COUNTER was equal to 1 the MAC entity randomly selected, with equal probability, a value in the interval [0, 1] which is above the probability configured by RRC in sl-ProbResourceKeep; or
1> if the pool of resources is configured or reconfigured by RRC; or
1> if there is no selected sidelink grant on the selected pool of resources; or
1> if neither transmission nor retransmission has been performed by the MAC entity on any resource indicated in the selected sidelink grant during the last second; or
1> if sl-ReselectAfter is configured and the number of consecutive unused transmission opportunities on resources indicated in the selected sidelink grant, which is incremented by 1 when none of the resources of the selected sidelink grant within a resource reservation interval is used, is equal to sl-ReselectAfter; or
1> if the selected sidelink grant cannot accommodate a RLC SDU by using the maximum allowed MCS configured by RRC in sl-MaxMCS-PSSCH associated with the selected MCS table and the UE selects not to segment the RLC SDU; or
NOTE 1: If the selected sidelink grant cannot accommodate the RLC SDU, it is left for UE implementation whether to perform segmentation or sidelink resource reselection.
1> if transmission(s) with the selected sidelink grant cannot fulfil the remaining PDB of the data in a logical channel, and the MAC entity selects not to perform transmission(s) corresponding to a single MAC PDU:
NOTE 2: If the remaining PDB is not met, it is left for UE implementation whether to perform transmission(s) corresponding to single MAC PDU or sidelink resource reselection.
NOTE 3: It is left for UE implementation whether to trigger the TX resource (re-)selection due to the latency requirement of the MAC CE triggered according to clause 5.22.1.7.
2> clear the selected sidelink grant associated to the Sidelink process, if available;
2> trigger the TX resource (re-)selection.

5.22.1.3 Sidelink HARQ Operation
5.22.1.3.1 Sidelink HARQ Entity

The MAC entity includes at most one Sidelink HARQ entity for transmission on SL-SCH, which maintains a number of parallel Sidelink processes.
The maximum number of transmitting Sidelink processes associated with the Sidelink HARQ Entity is 16. A sidelink process may be configured for transmissions of multiple MAC PDUs. For transmissions of multiple MAC PDUs with Sidelink resource allocation mode 2, the maximum number of transmitting Sidelink processes associated with the Sidelink HARQ Entity is 4.
A delivered sidelink grant and its associated Sidelink transmission information are associated with a Sidelink process. Each Sidelink process supports one TB.

For each sidelink grant, the Sidelink HARQ Entity shall:
1> if the MAC entity determines that the sidelink grant is used for initial transmission as specified in clause 5.22.1.1; or
1> if the sidelink grant is a configured sidelink grant and no MAC PDU has been obtained in an sl-PeriodCG of the configured sidelink grant; or
1> if the sidelink grant is a dynamic sidelink grant or selected sidelink grant and no MAC PDU has been obtained in the previous sidelink grant when PSCCH duration(s) and $2^{nd}$ stage SCI on PSSCH of the previous sidelink grant is not in SL DRX Active time as specified in clause 5.28.3 of any destination that has data to be sent:
NOTE 1: Void.
2> (re-)associate a Sidelink process to this grant, and for the associated Sidelink process:
2> if all PSCCH duration(s) and PSSCH duration(s) for initial transmission of a MAC PDU of the dynamic sidelink grant or the configured sidelink grant is not in SL DRX Active time as specified in clause 5.28.3 of the destination that has data to be sent:
3> ignore the sidelink grant.
NOTE 1A: The Sidelink HARQ Entity will associate the selected sidelink grant to the Sidelink process determined by the MAC entity.
3> obtain the MAC PDU to transmit from the Multiplexing and assembly entity, if any;
3> if a MAC PDU to transmit has been obtained:
4> if a HARQ Process ID has been set for the sidelink grant:
5> (re-)associate the HARQ Process ID corresponding to the sidelink grant to the Sidelink process.
NOTE 1a: There is one-to-one mapping between a HARQ Process ID and a Sidelink process in the MAC entity configured with Sidelink resource allocation mode 1.
4> determines Sidelink transmission information of the TB for the source and destination pair of the MAC PDU as follows:
5> set the Source Layer-1 ID to the 8 LSB of the Source Layer-2 ID of the MAC PDU;
5> set the Destination Layer-1 ID to the 16 LSB of the Destination Layer-2 ID of the MAC PDU;
5> (re-)associate the Sidelink process to a Sidelink process ID;
NOTE 1b: How UE determine Sidelink process ID in SCI is left to UE implementation for $N_R$ sidelink.
5> consider the NDI to have been toggled compared to the value of the previous transmission corresponding to the Sidelink identification information and the Sidelink process ID of the MAC PDU and set the NDI to the toggled value;
NOTE 2: The initial value of the NDI set to the very first transmission for the associated Sidelink process is left to UE implementation.
5> set the cast type indicator to one of broadcast, groupcast and unicast as indicated by upper layers;
5> if HARQ feedback has been enabled for the MAC PDU according to clause 5.22.1.4.2;
6> set the HARQ feedback enabled/disabled indicator to enabled.
5> else:
6> set the HARQ feedback enabled/disabled indicator to disabled.
5> set the priority to the value of the highest priority of the logical channel(s), if any, and a MAC CE, if included, in the MAC PDU;

5> if HARQ feedback is enabled for groupcast:
  6> if both a group size and a member ID are provided by upper layers and the group size is not greater than the number of candidate PSFCH resources associated with this sidelink grant:
    7> select either positive-negative acknowledgement or negative-only acknowledgement.
NOTE 4: Selection of positive-negative acknowledgement or negative-only acknowledgement is up to UE implementation.
  6> else:
    7> select negative-only acknowledgement.
  6> if negative-only acknowledgement is selected, UE's location information is available, and sl-TransRange has been configured for a logical channel in the MAC PDU, and sl-ZoneConfig is configured as specified in TS 38.331 [5]:
    7> set the communication range requirement to the value of the longest communication range of the logical channel(s) in the MAC PDU;
    7> determine the value of sl-ZoneLength corresponding to the communication range requirement and set Zone_id to the value of Zone_id calculated using the determined value of sl-ZoneLength as specified in TS 38.331 [5].
  5> set the Redundancy version to the selected value.
  4> deliver the MAC PDU, the sidelink grant and the Sidelink transmission information of the TB to the associated Sidelink process;
  4> instruct the associated Sidelink process to trigger a new transmission.
3> else:
  4> flush the HARQ buffer of the associated Sidelink process.
1> else (i.e. retransmission):
  2> if the HARQ Process ID corresponding to the sidelink grant received on PDCCH, the configured sidelink grant or the selected sidelink grant is associated to a Sidelink process of which HARQ buffer is empty; or
  2> if the HARQ Process ID corresponding to the sidelink grant received on PDCCH is not associated to any Sidelink process; or
  2> if PSCCH duration(s) and PSSCH duration(s) for one or more retransmissions of a MAC PDU of the dynamic sidelink grant or the configured sidelink grant is not in SL DRX Active time as specified in clause 5.28.3 of the destination that has data to be sent:
    3> ignore the sidelink grant.
  2> else:
    3> identify the Sidelink process associated with this grant, and for the associated Sidelink process:
      4> deliver the sidelink grant of the MAC PDU to the associated Sidelink process;
      4> instruct the associated Sidelink process to trigger a retransmission.

5.22.1.3.1 a Sidelink Process

The Sidelink process is associated with a HARQ buffer. New transmissions and retransmissions are performed on the resource indicated in the sidelink grant as specified in clause 5.22.1.1 and with the MCS selected as specified in clause 8.1.3.1 of TS 38.214 [7] and clause 5.22.1.1.
If the Sidelink process is configured to perform transmissions of multiple MAC PDUs with Sidelink resource allocation mode 2, the process maintains a counter SL_RE-SOURCE_RESELECTION_COUNTER. For other configurations of the Sidelink process, this counter is not available.
Priority of a MAC PDU is determined by the highest priority of the logical channel(s) or a MAC CE in the MAC PDU.
If the Sidelink HARQ Entity requests a new transmission, the Sidelink process shall:
  1> store the MAC PDU in the associated HARQ buffer;
  1> store the sidelink grant received from the Sidelink HARQ Entity;
  1> generate a transmission as described below.
If the Sidelink HARQ Entity requests a retransmission, the Sidelink process shall:
  1> store the sidelink grant received from the Sidelink HARQ Entity;
  1> generate a transmission as described below.
To generate a transmission, the Sidelink process shall:
  1> if there is no uplink transmission; or
  1> if the MAC entity is able to simultaneously perform uplink transmission(s) and sidelink transmission at the time of the transmission; or
  1> if the other MAC entity and the MAC entity are able to simultaneously perform uplink transmission(s) and sidelink transmission at the time of the transmission respectively; or
  1> if there is a MAC PDU to be transmitted for this duration in uplink, except a MAC PDU obtained from the Msg3 buffer, the MSGA buffer, or prioritized as specified in clause 5.4.2.2, and the sidelink transmission is prioritized over uplink transmission:
    2> instruct the physical layer to transmit SCI according to the stored sidelink grant with the associated Sidelink transmission information;
    2> instruct the physical layer to generate a transmission according to the stored sidelink grant;
    2> if HARQ feedback has been enabled for the MAC PDU according to clause 5.22.1.4.2:
      3> instruct the physical layer to monitor PSFCH for the transmission and perform PSFCH reception as specified in clause 5.22.1.3.2.
    2> if sl-PUCCH-Config is configured by RRC for the stored sidelink grant:
      3> determine transmission of an acknowledgement on the PUCCH as specified in clause 5.22.1.3.2.
  1> if this transmission corresponds to the last transmission of the MAC PDU:
    2> decrement SL_RESOURCE_RESELECTION_COUNTER by 1, if available.
NOTE 1: If the number of HARQ retransmissions selected by the MAC entity has been reached, or if a positive acknowledgement to a transmission of the MAC PDU has been received, or if a negative-only acknowledgement was enabled in the SCI and no negative acknowledgement was received for the transmission of the MAC PDU, the MAC entity determines this transmission corresponds to the last transmission of the MAC PDU for Sidelink resource allocation mode 2. How to determine the last transmission in other cases is up to UE implementation.
  1> if sl-MaxTransNum corresponding to the highest priority of the logical channel(s) in the MAC PDU has been configured in sl-CG-MaxTransNumList for the sidelink grant by RRC and the number of transmissions of the MAC PDU has been reached to sl-MaxTransNum; or 1> if a positive acknowledgement to this transmission of the MAC PDU was received according to clause 5.22.1.3.2; or
1> if negative-only acknowledgement was enabled in the SCI and no negative acknowledgement was received for this transmission of the MAC PDU according to clause 5.22.1.3.2:
  2> flush the HARQ buffer of the associated Sidelink process.

The transmission of the MAC PDU is prioritized over uplink transmission(s) of the MAC entity or the other MAC entity if the following conditions are met:
  1> if the MAC entity is not able to perform this sidelink transmission simultaneously with all uplink transmission(s) at the time of the transmission, and
  1> if none of the uplink transmission(s) is prioritized by upper layer according to TS 23.287 [19], and
  1> if none of the $N_R$ uplink MAC PDU(s) includes any MAC CE prioritized as described in clause 5.4.3.1.3, and
  1> if ul-PrioritizationThres is configured and if the value of the highest priority of logical channel(s) of all the $N_R$ uplink transmission(s) is not lower than ul-PrioritizationThres, and
  1> if sl-PrioritizationThres is configured and if the value of the highest priority of logical channel(s) or a MAC CE in the MAC PDU is lower than sl-PrioritizationThres.
  NOTE 2: If the MAC entity is not able to perform this sidelink transmission simultaneously with all uplink transmissions as specified in clause 5.4.2.2 of TS 36.321 [22] at the time of the transmission, and prioritization-related information is not available prior to the time of this sidelink transmission due to processing time restriction, it is up to UE implementation whether this sidelink transmission is performed.

5.22.1.3.2 PSFCH Reception

The MAC entity shall for each PSSCH transmission:
  1> if an acknowledgement corresponding to the PSSCH transmission in clause 5.22.1.3.1a is obtained from the physical layer:
    2> deliver the acknowledgement to the corresponding Sidelink HARQ entity for the Sidelink process;
  1> else:
    2> deliver a negative acknowledgement to the corresponding Sidelink HARQ entity for the Sidelink process;
  1> if the PSSCH transmission occurs for a pair of Source Layer-2 ID and Destination Layer-2 ID corresponding to a PC5-RRC connection which has been established by upper layers:
    2> perform the HARQ-Based Sidelink RLF Detection procedure as specified in clause 5.22.1.3.3.

If sl-PUCCH-Config is configured by RRC, the MAC entity shall for a PUCCH transmission occasion:
  1> if the timeAlignmentTimer, associated with the TAG containing the Serving Cell on which the HARQ feedback is to be transmitted, is stopped or expired:
    2> not instruct the physical layer to generate acknowledgement(s) of the data in this TB.
  1> else if a MAC PDU has been obtained for a sidelink grant associated to the PUCCH transmission occasion in clause 5.22.1.3.1, the MAC entity shall:
    2> if the most recent transmission of the MAC PDU was not prioritized as specified in clause 5.22.1.3.1a:
      3> instruct the physical layer to signal a negative acknowledgement on the PUCCH according to clause 16.5 of TS 38.213 [6].
    2> else if HARQ feedback has been disabled for the MAC PDU and next retransmission(s) of the MAC PDU is not required; or
    2> else if all PSCCH duration(s) and PSSCH duration(s) for initial transmission of a MAC PDU of the dynamic sidelink grant or the configured sidelink grant is not in SL DRX Active time as specified in clause 5.28.3 of any destination that has data to be sent:
      3> instruct the physical layer to signal a positive acknowledgement corresponding to the transmission on the PUCCH according to clause 16.5 of TS 38.213 [6].
    2> else if HARQ feedback has been disabled for the MAC PDU, and no sidelink grant is available for next retransmission(s) of the MAC PDU (including immediately after all PSSCH duration(s) in an sl-PeriodCG for the sidelink grant, the number of transmissions of the MAC PDU has not reached sl-MaxTransNum corresponding to the highest priority of the logical channel(s) in the MAC PDU, if configured in sl-CG-MaxTransNumList for the sidelink grant by RRC), if any; or
    2> else if PSCCH duration(s) and PSSCH duration(s) for one or more retransmissions of a MAC PDU of the dynamic sidelink grant or the configured sidelink grant is not in SL DRX Active time as specified in clause 5.28.3 of the destination that has data to be sent:
      3> instruct the physical layer to signal a negative acknowledgement corresponding to the transmission on the PUCCH according to clause 16.5 of TS 38.213 [6].
    2> else:
      3> instruct the physical layer to signal an acknowledgement corresponding to the transmission on the PUCCH according to clause 16.5 of TS 38.213 [6]
  1> else:
    2> instruct the physical layer to signal a positive acknowledgement on the PUCCH according to clause 16.5 of TS 38.213 [6].

3.1 Definitions

Primary Cell: The MCG cell, operating on the primary frequency, in which the UE either performs the initial connection establishment procedure or initiates the connection re-establishment procedure.

Primary SCG Cell: For dual connectivity operation, the SCG cell in which the UE performs random access when performing the Reconfiguration with Sync procedure.

Secondary Cell: For a UE configured with CA, a cell providing additional radio resources on top of Special Cell.

Secondary Cell Group: For a UE configured with dual connectivity, the subset of serving cells comprising of the PSCell and zero or more secondary cells.

Serving Cell: For a UE in RRC_CONNECTED not configured with CA/DC there is only one serving cell comprising of the primary cell. For a UE in RRC_CONNECTED configured with CA/DC the term 'serving cells' is used to denote the set of cells comprising of the Special Cell(s) and all secondary cells.

Special Cell: For Dual Connectivity operation the term Special Cell refers to the PCell of the MCG or the PSCell of the SCG, otherwise the term Special Cell refers to the PCell.

SL-ConfiguredGrantConfig

The IE SL-ConfiguredGrantConfig specifies the configured grant configuration information for $N_R$ sidelink communication.

| SL-ConfiguredGrantConfig information element |
|---|
| -- ASN1START |
| -- TAG-SL-CONFIGUREDGRANTCONFIG-START |
| SL-ConfiguredGrantConfig-r16 : :=          SEQUENCE { |
|     sl-ConfigIndexCG-r16                   SL-ConfigIndexCG-r16, |
|     sl-PeriodCG-r16                        SL-PeriodCG-r16 |
| OPTIONAL, -- Need M |
|     sl-NrOfHARQ-Processes-r16              INTEGER (1..16) |
| OPTIONAL, -- Need M |
|     sl-HARQ-ProcID-offset-r16              INTEGER (0..15) |
| OPTIONAL, -- Need M |
|     sl-CG-MaxTransNumList-r16              SL-CG-MaxTransNumList-r16 |
| OPTIONAL, -- Need M |
|     rrc-ConfiguredSidelinkGrant-r16        SEQUENCE { |
|         sl-TimeResourceCG-Type1-r16        INTEGER (0..496) |
| OPTIONAL, -- Need M |
|         sl-StartSubchannelCG-Type1-r16     INTEGER (0..26) |
| OPTIONAL, -- Need M |
|         sl-FreqResourceCG-Type1-r16        INTEGER (0..6929) |
| OPTIONAL, -- Need M |
|         sl-FreqResourceCG-Type1-r16        INTEGER (0..7999) |
| OPTIONAL, -- Need R |
|         sl-N1PUCCH-AN-r16                  PUCCH-ResourceId |
| OPTIONAL, -- Need M |
|         sl-PSFCH-ToPUCCH-CG-Type1-r16      INTEGER (0..15) |
| OPTIONAL, -- Need M |
|         sl-ResourcePoolID-r16              SL-ResourcePoolID-r16 |
| OPTIONAL, -- Need M |
|         sl-TimeReferenceSFN-Type1-r16      ENUMERATED {sfn512} |
| OPTIONAL -- Need S |
|     } |
| OPTIONAL, -- Need M |
|     ..., |
|     [[ |
|     sl-N1PUCCH-AN-Type2-r16                PUCCH-ResourceId |
| OPTIONAL -- Need M |
|     ]] |
| } |
| SL-ConfigIndexCG-r16 : :=     INTEGER (0..maxNrofCG-SL-1-r16) |
| SL-CG-MaxTransNumList-r16 : :=  SEQUENCE (SIZE (1..8) ) OF SL-CG-MaxTransNum-r16 |
| SL-CG-MaxTransNum-r16 : : =    SEQUENCE { |
|     sl-Priority-r16                        INTEGER (1..8), |
|     sl-MaxTransNum-r16                     INTEGER (1..32) |
| } |
| SL-PeriodCG-r16 : :=          CHOICE { |
|     sl-PeriodCG1-r16              ENUMERATED {ms100, ms200, ms300, ms400, ms500, ms600, ms700, ms800, ms900, ms1000, spare6, |
|                                               spare5, spare4, spare3, spare2, spare1}, |
|     sl-PeriodCG2-r16              INTEGER (1..99) |
| } |
| -- TAG-SL-CONFIGUREDGRANTCONFIG-STOP |
| -- ASN1 STOP |

SL-ConfiguredGrantConfig Field Descriptions sl-ConfigIndexCG

This field indicates the ID to identify configured grant for sidelink.

sl-CG-MaxTransNumList

This field indicates the maximum number of times that a TB can be transmitted using the resources provided by the configured grant. sl-Priority corresponds to the logical channel priority.

sl-FreqResourceCG-Type1

Indicates the frequency resource location of sidelink configured grant type 1. An index giving valid combinations of one or two starting sub-channel and length (jointly encoded) as resource indicator value (RIV), as defined in TS 38.214 [19].

sl-HARQ-ProcID-Offset

Indicates the offset used in deriving the HARQ process ID for SL configured grant type 1 or SL configured type 2, see TS 38.321 [3], clause 5.8.3.

sl-N1PUCCH-AN

This field indicates the HARQ resource for PUCCH for sidelink configured grant type 1. The actual PUCCH-Resource is configured in sl-PUCCH-Config and referred to by its ID.

sl-N1PUCCH-AN-Type2

This field indicates the HARQ resource for PUCCH for PSCCH/PSSCH transmissions without a corresponding PDCCH on sidelink configured grant type 2. The actual PUCCH-Resource is configured in sl-PUCCH-Config and referred to by its ID.

sl-NrOfHAR-Processes
This field indicates the number of HARQ processes configured for a specific configured grant. It applies for both Type 1 and Type 2.
sl-PeriodCG
This field indicates the period of sidelink configured grant in the unit of ms.
sl-PSFCH-ToPUCCH-CG-Type1
This field, for configured grant type 1, indicates slot offset between the PSFCH associated with the last PSSCH resource of each period and the PUCCH occasion used for reporting sidelink HARQ.
sl-ResourcePoolID
Indicates the resource pool in which the configured sidelink grant Type 1 is applied.
sl-StartSubchannelCG-Type1
This field indicates the starting sub-channel of sidelink configured grant Type 1. An index giving valid sub-channel index.

sl TimeOffsetCG-Type1 This field indicates the slot offset with respect to logical slot defined by sl-TimeReferenceSFN-Type1, as specified in TS 38.321 [3].
al-imeReferenceSFN-Type1
Indicates SFN used for determination of the offset of a resource in time domain. If it is present, the UE uses the $1^{st}$ logical slot of associated resource pool after the starting time of the closest SFN with the indicated number preceding the reception of the sidelink configured grant configuration Type 1 as reference logical slot, see TS 38.321 [3], clause 5.8.3. If it is not present, the reference SFN is 0.
sl-TimeResourceCG-Type1
This field indicates the time resource location of sidelink configured grant Type 1. An index giving valid combinations of up to two slot positions (jointly encoded) as time resource indicator value (TRIV), as defined in TS 38.212 [17].
DRX-Config
The IE DRX-Config is used to configure DRX related parameters.

| DRX-Config information element |
|---|

```
-- ASN1 START
-- TAG-DRX-CONFIG-START
DRX-Config : :=                 SEQUENCE {
    drx-onDurationTimer             CHOICE {
                                        subMilliSeconds INTEGER (1..31) ,
                                        milliSeconds ENUMERATED {
                                            ms1, ms2, ms3, ms4, ms5, ms6, ms8, ms10, ms20, ms30,
ms40, ms50, ms60,
                                            ms80, ms100, ms200, ms300, ms400, ms500, ms600,
ms800, ms1000, ms1200,
                                            ms1600, spare8, spare7, spare6, spare5, spare4,
spare3, spare2, spare1 }
                                    },
    drx-InactivityTimer             ENUMERATED {
                                        ms0, ms1, ms2, ms3, ms4, ms5, ms6, ms8, ms10, ms20, ms30,
ms40, ms50, ms60, ms80,
                                        ms100, ms200, ms300, ms500, ms750, ms1280, ms1920,
ms2560, spare9, spare8,              spare7, spare6, spare5, spare4, spare3, spare2, spare1},
    drx-HARQ-RTT-TimerDL            INTEGER (0..56),
    drx-HARQ-RTT-TimerUL            INTEGER (0..56),
    drx-RetransmissionTimerDL       ENUMERATED {
                                        s10, s11, s12, s14, s16, s18, sl16, s124, s133, s140,
s164, s180, s196, s1112, s1128,
                                        s1160, s1320, spare15, spare14, spare13, spare12,
spare11, spare10, spare9,
                                        spare8, spare7, spare6, spare5, spare4, spare3, spare2,
spare1},
    drx-RetransmissionTimerUL       ENUMERATED {
                                        s10, s11, s12, s14, s16, s18, sl16, s124, s133, s140,
s164, s180, s196, s1112, s1128,
                                        s1160, s1320, spare15, spare14, spare13, spare12,
spare11, spare10, spare9,
                                        spare8, spare7, spare6, spare5, spare4, spare3, spare2,
spare1 },
    drx-LongCycleStartOffset        CHOICE {
        ms10                            INTEGER (0..9),
        ms20                            INTEGER (0..19),
        ms32                            INTEGER (0..31),
        ms40                            INTEGER (0..39),
        ms 60                           INTEGER (0..59),
        ms 64                           INTEGER (0..63),
        ms 70                           INTEGER (0..69),
        ms80                            INTEGER (0..79),
        ms128                           INTEGER (0..127),
        ms160                           INTEGER (0..159),
        ms256                           INTEGER (0..255),
        ms320                           INTEGER (0..319),
        ms512                           INTEGER (0..511),
        ms 640                          INTEGER (0..639),
        ms1024                          INTEGER (0..1023),
        ms1280                          INTEGER (0..1279),
        ms2048                          INTEGER (0..2047),
        ms2560                          INTEGER (0..2559),
        ms5120                          INTEGER (0..5119),
```

| DRX-Config information element |  |
| --- | --- |
| ms10240 }, | INTEGER (0..10239) |
| shortDRX drx-ShortCycle | SEQUENCE { ENUMERATED { ms2, ms3, ms4, ms5, ms6, ms7, ms8, ms10, ms14, ms16, ms20, ms30, ms32, ms35, ms40, ms64, ms80, ms128, ms160, ms256, ms320 ms512, ms640, spare9, spare8, spare7, spare6, spare5, spare4, spare3, spare2, spare1 }, |
| drx-ShortCycleTimer } OPTIONAL, -- Need R | INTEGER (1..16) |
| drx-SlotOffset } | INTEGER (0..31) |
| DRX-ConfigExt-v1700 ::= drx-HARQ-RTT-TimerDL-r17 drx-HARQ-RTT-TimerUL-r17 } -- TAG-DRX-CONFIG-STOP --ASN1 STOP | SEQUENCE { INTEGER (0..448), INTEGER (0..448) |

DRX-Config field descriptions
drx-HARQ-RTT-TimerDL
Value in number of symbols of the BWP where the transport block was received. drx-HARQ-RTT-TimerDL-r17is only applicable for SCS 480 kHz and 960 kHz. If configured, the UE shall ignore drx-HARQ-RTT-TimerDL (without suffix) for SCS 480 kHz and 960 kHz.
drx-HARQ-RTT-TimerUL
Value in number of symbols of the BWP where the transport block was transmitted. drx-HARQ-RTT-TimerUL-r17is only applicable for SCS 480 kHz and 960 kHz. If configured, the UE shall ignore drx-HARQ-RTT-TimerUL (without suffix) for SCS 480 kHz and 960 kHz.
drx-InactivityTimer
Value in multiple integers of 1 ms. ms0 corresponds to 0, ms1 corresponds to 1 ms, ms2 corresponds to 2 ms, and so on.
drx-LongCycleStartOffset
drx-LongCycle in ms and drx-StartOffset in multiples of 1 ms. If drx-ShortCycle is configured, the value of drx-LongCycle shall be a multiple of the drx-ShortCycle value.
drx-onDurationTimer
Value in multiples of 1/32 ms (subMilliSeconds) or in ms (milliSecond). For the latter, value ms1 corresponds to 1 ms, value ms2 corresponds to 2 ms, and so on.
drx-RetransmissionTimerDL
Value in number of slot lengths of the BWP where the transport block was received. value sl0 corresponds to 0 slots, sl1 corresponds to 1 slot, sl2 corresponds to 2 slots, and so on.
drx-RetransmissionTimerUL
Value in number of slot lengths of the BWP where the transport block was transmitted. sl0 corresponds to 0 slots, sl1 corresponds to 1 slot, sl2 corresponds to 2 slots, and so on.
drx-ShortCycleTimer
Value in multiples of drx-ShortCycle. A value of 1 corresponds to drx-ShortCycle, a value of 2 corresponds to 2*drx-ShortCycle and so on.
drx-ShortCycle
Value in ms. ms1 corresponds to 1 ms, ms2 corresponds to 2 ms, and so on.
drx-SlotOffset
Value in 1/32 ms. Value 0 corresponds to 0 ms, value 1 corresponds to 1/32 ms, value 2 corresponds to 2/32 ms, and so on.
DRX-ConfigSecondaryGroup
The IE DRX-ConfigSecondaryGroup is used to configure DRX related parameters for the second DRX group as specified in TS 38.321 [3].

| DRX-ConfigSecondaryGroup information element |  |
| --- | --- |
| -- ASN1 START -- TAG-DRX-CONFIGSECONDARYGROUP-START DRX-ConfigSecondaryGroup-r16 ::= drx-onDurationTimer-r16 | SEQUENCE { CHOICE { subMilliseconds INTEGER (1..31) , milliSeconds ENUMERATED { ms1, ms2, ms3, ms4, ms5, ms6, ms8, ms10, ms20, ms30, ms40, ms50, ms60, ms80, ms100, ms200, ms300, ms400, ms500, ms600, ms800, ms1000, ms1200, ms1600, spare8, spare7, spare6, spare5, spare4, spare3, spare2, spare1 } }, |
| drx-InactivityTimer-r16 | ENUMERATED { ms0, ms1, ms2, ms3, ms4, ms5, ms6, ms8, ms10, ms20, ms30, ms40, ms50, ms60, ms80, ms100, ms200, ms300, ms500, ms750, ms1280, ms1920, ms2560, |

-continued

DRX-ConfigSecondaryGroup information element spare9, spare8,
                                        spare7, spare6, spare5, spare4, spare3, spare2, spare1}
}
-- TAG-DRX-CONFIGSECONDARYGROUP-STOP
-- ASN1STOP DRX-ConfigSecondaryGroup field descriptions
drx-InactivityTimer
Value in multiple integers of 1 ms. ms0 corresponds to 0 ms, ms1 corresponds to 1 ms, ms2 corresponds to 2 ms, and so on, as specified in TS 38.321 [3]. The network configures a drx-InactivityTimer value for the second DRX group that is smaller than the drx-InactivityTimer configured for the default DRX group in IE DRX-Config.
drx-onDurationTimer
Value in multiples of 1/32 ms (subMilliSeconds) or in ms (milliSeconds). For the latter, value ms1 corresponds to 1 ms, value ms2 corresponds to 2 ms, and so on, as specified in TS 38.321 [3]. The network configures a drx-onDuration Timer value for the second DRX group that is smaller than the drx-onDurationTimer configured for the default DRX group in IE DRX-Config.
  DRX-ConfigSL
The IE DRX-ConfigSL is used to configure additional DRX parameters for the UE performing sidelink operation with resource allocation mode 1, as specified in TS 38.321 [3].

(node). For an SL transmission, the UE could receive an SL Hybrid Automatic Repeat Request (HARQ) feedback (if or when SL data in the SL transmission enables HARQ feedback). The UE could transmit a Physical Uplink Control Channel (PUCCH) transmission to a network (node) (if or when the PUCCH resource is configured). The UE could be configured with Discontinuous Reception (DRX). The UE could discontinuously monitor Physical Downlink Control Channel (PDCCH) and/or Downlink Control Information (DCI) (for monitoring Radio Network Temporary Identifier (RNTI)) based on DRX configuration. The UE could be configured with DRX timer(s) for PDCCH/DCI monitoring. The DRX timer(s) could include timer(s) associated with SL transmission/reception(s). For example, the DRX timer(s) could include drx-HARQ-RTT-TimerSL and/or drx-RetransmissionTimerSL. The UE could start drx-HARQ-RTT-TimerSL (for a corresponding HARQ process) in response to (or after) a PUCCH transmission (of an SL HARQ feedback) associated with a PSSCH transmission (or start drx-HARQ-RTT-TimerSL after the PSSCH transmission).

DRX-ConfigSL information element

-- ASN1 START
-- TAG-DRX-CONFIGSL-START
DRX-ConfigSL-r17 : :=           SEQUENCE {
drx-HARQ-RTT-TimerSL-r17          INTEGER (0..56),
drx-RetransmissionTimerSL-r17     ENUMERATED {s10, s11, s12, s14, s16, s18, s116, s124, s133, s140,
s164, s180, s196, s1112, s1128,
                                        s1160, s1320, spare15, spare14, spare13, spare12,
spare11, spare10, spare9, spare8,
                                        spare7, spare6, spare5, spare4, spare3, spare2,
spare1}
}
-- TAG-DRX-CONFIGSL-STOP
-- ASN1 STOP DRX-ConfigSL Field Descriptions
drx-HARQ-RTT-TimerSL
Value in number of symbols of the BWP where the PDCCH was transmitted. drx-RetransmissionTimerSL
Value in number of slot lengths of the BWP where the PDCCH was transmitted. sl0 corresponds to 0 slots, sl1 corresponds to 1 slot, sl2 corresponds to 2 slots, and so on.
  In New Radio ($N_R$), Sidelink (SL) communication is introduced. An SL User Equipment (UE) could perform SL communication with other SL UE(s) via unicast, groupcast, and/or broadcast. The UE could be configured with Sidelink resource allocation mode 1 and/or mode 2. For Sidelink resource allocation mode 1, the UE could be scheduled by a network (node) with SL resource(s) or SL grant for SL transmission(s). The UE could be configured with SL configured grant configuration(s) (type-1 or type-2). The UE could initialize configured sidelink grant(s) to determine Physical Sidelink Control Channel (PSCCH) and/or Physical Sidelink Shared Channel (PSSCH) duration(s) for periodic transmission(s) (without dynamic scheduled SL grant) or could be activated via an activation signal by the network For example, the UE could start drx-HARQ-RTT-TimerSL (for a corresponding HARQ process) in the first symbol after the end of a PUCCH transmission carrying an SL HARQ feedback associated with a PSSCH transmission as specified in [1] 3GPP 38.321 v17.2.0. For another example, the UE could start drx-HARQ-RTT-TimerSL (for a corresponding HARQ process) at the first symbol after the end of a corresponding PSSCH transmission as specified in [1] 3GPP 38.321 v17.2.0. The length of the DRX timer(s) could be in unit of symbol(s). However, since the numerology (or subcarrier spacing, or number of slot(s) per subframe) of carriers/Bandwidth Parts (BWP(s)) could be different, the length of symbol(s) could be different among all BWP(s). In the current specification, the length of DRX timer(s) is in value in number of symbols of the BWP where a PDCCH was transmitted. However, the definition of the PDCCH is unclear. Secondly, for configured sidelink grant (type-1 or type 2), there could be no PDCCH association/indication for the PUCCH/PSSCH transmission and, therefore, the length value would be unknown to the UE, or the length would be different between the UE and the network (node), which could cause data loss or interruption due to different acknowledgement on the UE's DRX active time.

The present invention discloses and discusses possible solutions for handling DRX timers for monitoring PDCCH regarding SL transmissions.

Based on PUCCH Resource Numerology (if or when PUCCH is Configured)

One concept of the present invention is that the UE could determine a BWP associated with at least one timer based on at least a PUCCH resource/transmission.

The UE could determine numerology(ies) (e.g., slot/symbol length) associated with at least one timer based on at least a numerology of a BWP associated with a PUCCH resource/transmission. The UE could determine the numerology associated with the at least one timer based on the numerology of the BWP associated with the PUCCH resource/transmission if or when the PUCCH resource is configured.

The UE could be configured with a value for a timer in the at least one timer. The UE could determine a BWP (id) based on the PUCCH resource/transmission. The UE could determine/select the BWP where the PUCCH was transmitted and/or the PUCCH resource is associated with the BWP.

The UE could calculate a length of the timer based on at least the value of the timer and the length of symbol/slot of the determined BWP.

The PUCCH resource/transmission could be associated with transmitting an SL HARQ feedback associated with an SL transmission. The SL transmission could be associated with an SL HARQ process associated with the at least one timer.

For example, the UE could select/determine the numerology associated with the at least one timer (e.g., a (symbol/slot) length associated with the at least one timer) associated with an SL transmission (PSSCH transmission) based on at least symbol/slot length associated with a BWP where a PUCCH transmission carry an SL HARQ feedback is transmitted (e.g., set to/select the same value as the symbol/slot length of the BWP).

The SL HARQ feedback could be associated with the SL transmission. The PUCCH transmission is transmitted via the PUCCH resource configured for the SL HARQ feedback.

Additionally and/or alternatively, the UE could select/determine a symbol/slot length associated with the at least one timer associated with an SL transmission (PSSCH transmission) based on at least symbol/slot length associated with a BWP of a PUCCH resource. The PUCCH resource could be configured/set for an SL HARQ feedback associated with the SL transmission. The PUCCH (transmission associated with the PUCCH resource) may not be transmitted.

Based on Scheduled/Activated BWP

Additionally and/or alternatively, the UE could determine the BWP associated with the at least one timer based on at least a PDCCH transmission (associated with the SL transmission).

Additionally and/or alternatively, the UE could set/determine a numerology (e.g., slot/symbol length) associated with the at least one timer associated with an SL transmission (PSSCH transmission) based on at least symbol/slot length associated with a BWP of a PDCCH transmission. The PDCCH transmission could be used to schedule the SL transmission. The SL transmission could be associated with a dynamic SL grant. Additionally and/or alternatively, the PDCCH transmission could be used to activate a configured SL grant. The SL transmission could be associated with a (type-2) configured SL grant.

Based on where PDCCH Activation Signal is Received/where RRC Message is Received Additionally and/or alternatively, the UE could determine/select the slot/symbol length associated with the at least one timer for the SL HARQ process as slot/symbol length of a BWP where a first PDCCH was transmitted (for configured SL grant) if or when the associated SL transmission is associated with a configured SL grant. Additionally and/or alternatively, the UE could determine/select a BWP (to select the slot/symbol length associated with the at least one timer for the SL HARQ process) based on where the first PDCCH was transmitted (for configured SL grant). The first PDCCH is associated with (or used to schedule) transmission or configuration or initiation or activation of the configured SL grant. The configured SL grant could be a type-1 or type-2 configured SL grant.

Additionally and/or alternatively, the UE could select/determine a numerology (e.g., slot/symbol length) associated with the at least one timer associated with an SL transmission (PSSCH transmission) based on at least symbol/slot length associated with a BWP where a Radio Resource Control (RRC) message is received. The RRC message could indicate/include sidelink configured grant configuration (e.g., SL-ConfiguredGrantConfig or rrc-ConfiguredSidelinkGrant) associated with the SL transmission.

Network Explicitly Configures

Additionally and/or alternatively, a network (node) (e.g., Next Generation Node B (gNB)) could configure or indicate numerology(ies) for the at least one timer. For example, the network (node) could indicate slot/symbol length for drx-HARQ-RTT-TimerSL and/or drx-RetransmissionTimerSL. For another example, the network (node) could indicate BWP id(s) and/or Cell id(s) for each of the at least one timer. The network (node) could configure/indicate BWP for the at least one timer (for selecting/determining slot/symbol length). The UE could derive the numerology(ies) or select the numerology(ies) associated with the at least one timer based on the numerology(ies) of the BWP(s) (of the Cell(s)) indicated by the network (node).

The network (node) could configure or indicate the numerology(ies) in DRX-ConfigSL. Additionally and/or alternatively, the network (node) could configure or indicate the numerology(ies) in SL-ConfiguredGrantConfig or rrc-ConfiguredSidelinkGrant. The network (node) could configure or indicate the numerology(ies) and the at least one timer at a same time and/or in a same message (e.g., an RRC message).

The network (node) could configure or indicate the BWP id(s) and/or Cell id(s) in DRX-ConfigSL. Additionally and/or alternatively, the network (node) could configure or indicate the BWP id(s) and/or Cell id(s) in SL-ConfiguredGrantConfig or rrc-ConfiguredSidelinkGrant. The network (node) could configure or indicate the BWP id(s) and/or Cell id(s) and the at least one timer at a same time and/or in a same message (e.g., an RRC message).

Pre-Configure

Additionally and/or alternatively, the UE could be pre-configured with numerology(ies) for the at least one timer. The UE could be pre-configured with length of slot/symbols for the at least one timer for SL configured grant (or SL dynamic grant).

Where the Retransmission Grant would be Transmitted

Additionally and/or alternatively, the UE could determine the numerology(ies) based on numerology of a BWP. The BWP could be used to receive retransmission SL grant associated with the SL transmission (associated with the at least one timer).
PCell or PSCell Additionally and/or alternatively, the UE could determine the numerology(ies) associated with the at least one timer based on numerology of a (initial, default, active, activated, or a configured) BWP of a Primary Cell (PCell). For example, the UE could determine symbol/slot length associated with the at least one timer as the symbol/slot length of (initial, default, or active) BWP of the PCell. Additionally and/or alternatively, the UE could determine the numerology(ies) based on numerology of a (initial, default, active, activated, or a configured) BWP of a Primary Secondary Cell (PSCell). For example, the UE could determine symbol/slot length of the at least one timer as the symbol/slot length of (initial, default, or active) BWP of the PSCell.
Based on SL BWP Numerology Additionally and/or alternatively, the UE could determine the numerology(ies) associated with the at least one timer based on numerology of an (active) SL BWP. The SL BWP could be an SL BWP associated with the SL transmission and/or the SL HARQ process. For example, the UE could determine symbol/slot length associated with the at least one timer as the symbol/slot length of the (initial, default, or active) SL BWP. For example, the UE could determine symbol/slot length associated with the at least one timer as the symbol/slot length of an SL BWP associated with the SL HARQ process or the SL transmission associated with the at least one timer.
Different Determination Method Based on Different SL Grant The at least one timer could be associated with an SL HARQ process. The SL HARQ process could be associated with an SL transmission of an SL grant.

Additionally and/or alternatively, the UE could determine the numerology(ies) associated with the at least one timer (e.g., using different methods indicated in the invention) based on at least a type of the SL grant.

The type of the SL transmission could be a dynamic SL grant. The dynamic SL grant could be scheduled by the network (node) via a PDCCH. The type of the SL transmission could be a (type-1) configured SL grant. The (type-1) configured SL grant could be configured (via RRC message) by the network (node) (and stored by the UE). The type of the SL transmission could be a (type-2) configured SL grant. The (type-2) configured SL grant could be configured (via RRC message) and activated by the network (node) via an activation signal.

For example, the UE could select/determine the slot/symbol length associated with the at least one timer for an SL HARQ process as slot/symbol length of a BWP where PDCCH was transmitted/received if or when an associated SL transmission is associated with a dynamic SL grant (wherein the dynamic SL grant is scheduled via the PDCCH). The UE could select/determine the slot/symbol length associated with the at least one timer for an SL HARQ process as slot/symbol length of a BWP where PDCCH was transmitted/received if or when an associated SL transmission is associated with a (type-2) configured SL grant (wherein the (type-2) configured SL grant is activated via the PDCCH). The UE could select/determine the slot/symbol length associated with the at least one timer for an SL HARQ process based on one of the methods indicated/mentioned above in the invention if or when the associated SL transmission is associated with a (type-1) configured SL grant. The UE could select/determine the slot/symbol length associated with the at least one timer for the SL HARQ process as slot/symbol length of a BWP where PUCCH was transmitted if or when the associated SL transmission is associated with a (type-1) configured SL grant (if PUCCH is configured). Additionally and/or alternatively, the UE could select/determine the slot/symbol length associated with the at least one timer for the SL HARQ process as slot/symbol length configured by the network (node) (for configured SL grant) if or when the associated SL transmission is associated with a (type-1) configured SL grant.

For another example, for sidelink configured grant Type 1, the UE could select or determine symbol/slot length associated with the at least one timer (e.g., drx-HARQ-RTT-TimerSL and drx-RetransmissionTimerSL) based on numerology of an active or activated Downlink (DL) BWP of a PCell. The time length for drx-HARQ-RTT-TimerSL is in symbols of active or activated DL BWP of the PCell. The timer length for drx-RetransmissionTimerSL is in slots of active or activated DL BWP of the PCell. For (other) SL grants which are not sidelink configured grant Type 1 (e.g., dynamic sidelink grant and/or sidelink configured grant Type 2), the UE could determine/select symbol/slot length associated with the at least one timer based on numerology of the DL BWP transmitting a PDCCH associated with the SL grants.
Same Determination Additionally and/or alternatively, the UE could determine how to select the numerology(ies) associated with the at least one timer regardless of the type of the SL transmission. The UE could determine how to select BWP(s) associated with the at least one timer (e.g., for the numerology(ies) associated with the at least one timer) regardless of the type of the SL transmission (e.g., configured SL grant or dynamically scheduled SL grant). The UE could use the same method (indicated/mentioned in the invention) to select BWP(s) associated with the at least one timer (e.g., for the numerology(ies) associated with the at least one timer) for any (or all) types of SL transmission/SL grant.

For example, the UE could select/determine the slot/symbol length associated with the at least one timer for an SL HARQ process based on a method indicated/mentioned above in the invention if or when an associated first SL transmission is associated with a (type-1) configured SL grant. For example, the UE could select/determine the slot/symbol length associated with the at least one timer for an SL HARQ process based on the method indicated/mentioned above in the invention if or when an associated second SL transmission is associated with a (type-2) configured SL grant. For example, the UE could select/determine the slot/symbol length associated with the at least one timer for an SL HARQ process based on the method indicated/mentioned above in the invention if or when an associated third SL transmission is associated with a dynamic SL grant.
SL CG does not Start or Restart the Timer(s)

Additionally and/or alternatively, the UE could determine whether to start or restart the at least one timer based on the type of SL grant associated with SL transmission associated with the at least one timer.

For example, the UE does not start or restart HARQ Round Trip Time (RTT) timer for the SL transmission if or when the SL transmission is associated with a configured SL grant. the UE could start or restart HARQ RTT timer for the SL transmission if or when the SL transmission is associated with a dynamic SL grant.

The following concepts, methods, alternatives, examples, and embodiments can be utilized with, in whole or in part, the concepts, methods, alternatives, examples, and embodiments above and herein.

The dynamic SL grant could be a sidelink grant scheduled by a PDCCH addressed to the UE's SL-RNTI and/or Sidelink Configured Scheduling (SLCS)-RNTI (with Network Device Interface (NDI)=1).

The type-2 configured SL grant could be a sidelink grant scheduled by a PDCCH addressed to the UE's SLCS-RNTI (with NDI=0).

The type-1 configured SL grant could be a sidelink grant configured by an RRC message (e.g., rrc-ConfiguredSidelinkGrant).

The numerology could be/indicate a length of a symbol or a length of a slot (for calculating a length of a timer).

The numerology could be/indicate a subcarrier spacing.

The numerology could be/indicate a number of slot(s) in one subframe (per subframe).

The numerology could be a slot/symbol length of a BWP.

The numerology could be/indicate a BWP id. The numerology could be/indicate symbol/slot length of the BWP associated with the BWP id.

The numerology could be/indicate a cell id (e.g., serving cell index). The numerology could be/indicate symbol/slot length of a (initial/active) BWP associated with the Cell id.

The number of symbols in a slot could be a fixed number (e.g., 14). Additionally and/or alternatively, the number of symbols in a slot could be configured (as one of a numerology).

The numerology could be a number of symbols associated with the at least one timer.

The SL transmission could be associated with a type-1 configured SL grant. The SL transmission could be associated with a type-2 configured SL grant. The SL transmission may not be associated with a dynamically scheduled SL grant.

Additionally and/or alternatively, the SL transmission could be associated with a dynamically scheduled SL grant or a configured SL grant.

The SL transmission could carry a Medium Access Control (MAC) Protocol Data Unit (PDU). The SL transmission could be transmitted via/using the SL HARQ process. The SL transmission could be associated with an SL HARQ process associated with the at least one timer. The SL transmission could be a PSSCH transmission (e.g., to a peer UE or an SL UE).

The BWP could be a DL BWP.

The at least one timer could be associated with an SL HARQ process and/or associated with an SL transmission.

The at least one timer could include a first DRX timer.

The first DRX timer could be a DRX timer associated with SL transmission.

The first DRX timer could be a HARQ RTT timer (e.g., drx-HARQ-RTT-TimerSL). The first DRX timer could be in unit of symbol(s). The UE could start or restart the first DRX timer in response to or after a PUCCH transmission (or PUCCH resource) associated with an SL HARQ feedback. For example, the UE could start the first DRX timer (e.g., drx-HARQ-RTT-TimerSL) in the first symbol after the end of a PUCCH transmission carrying an SL HARQ feedback associated with the SL transmission. For example, the UE could start the first DRX timer (e.g., drx-HARQ-RTT-TimerSL) at the first symbol after the end of the SL transmission. Additionally and/or alternatively, the UE could start or restart the first DRX timer in response to or after a PSSCH transmission (if or when no PUCCH configuration associated with the PSSCH transmission is configured).

The at least one timer could include a second DRX timer.

The second DRX timer could be a retransmission timer (e.g., drx-RetransmissionTimerSL). The second DRX timer could be in unit of slot(s). The UE could monitor PDCCH (of a BWP) when the timer is running. The UE could start the second DRX timer after expiration/expiry of the first DRX timer. For example, the UE could start the second DRX timer (e.g., drx-RetransmissionTimerSL) in the first symbol after expiration/expiry of the first DRX timer.

The at least one timer could be associated with a (SL) HARQ process.

The network (node) could determine/select BWP associated with the at least one timer based on/using a same determination/method as the UE.

The network (node) could determine/select numerology(ies) associated with the at least one timer based on/using a same determination/method (mentioned above) as the UE.

SL configured grant Type-1, SL configured grant Type 1, Type-1 SL configured grant, Type 1 SL configured grant, configured SL grant Type-1, configured SL grant Type 1, Type-1 configured SL grant, Type 1 configured SL grant could be interchangeable and/or be the same.

SL configured grant Type-2, SL configured grant Type 2, Type-2 SL configured grant, Type 2 SL configured grant, configured SL grant Type-2, configured SL grant Type 2, Type-2 configured SL grant, Type 2 configured SL grant could be interchangeable and/or be the same.

Any of the above and herein methods, alternatives, teachings, concepts, and embodiments may be combined or applied simultaneously.

An example text proposal based on [2] 3GPP 38.331 v17.2.0 is shown below, in accordance with embodiments of the present invention:

========Option 1 Start========

DRX-ConfigSL
The IE DRX-ConfigSL is used to configure additional DRX parameters for the UE performing sidelink operation with resource allocation mode 1, as specified in TS 38.321 [3].

DRX-ConfigSL information element

```
-- ASN1 START
-- TAG-DRX-CONFIGSL-START
DRX-ConfigSL-r17 ::=        SEQUENCE {
    drx-HARQ-RTT-TimerSL-r17        INTEGER (0..56),
    drx-RetransmissionTimerSL-r17   ENUMERATED {s10, s11, s12, s14, s16, s18, s116, s124, s133, s140,
s164, s180, s196, s1112, s1128,
```

-continued

| DRX-ConfigSL information element |
|---|
| s1160, s1320, spare15, spare14, spare13, spare12, spare11, spare10, spare9, spare8, spare7, spare6, spare5, spare4, spare3, spare2, spare1}, <br>     BWP-Id                BWP-Id, <br>     Cell-Id                 ServCellIndex <br> } <br> -- TAG-DRX-CONFIGSL-STOP <br> -- ASN1 STOP |

DRX-ConfigSL Field Descriptions
drx-HARQ-RTT-TimerSL
Value in number of symbols of the BWP indicated by BWP-Id and Cell-Id.
drx-RetransmissionTimerSL
Value in number of slot lengths of the BWP indicated in BWP-Id and Cell-Id. sl0 corresponds to 0 slots, sl1 corresponds to 1 slot, sl2 corresponds to 2 slots, and so on.

=======Option 1 End=======

=======Option 2 Start=======

DRX-ConfigSL Field Descriptions
drx-HARQ-RTT-TimerSL
Value in number of symbols of the BWP where the PDCCH that scheduled or activated the associated SL grant was transmitted.
drx-RetransmissionTimerSL
Value in number of slot lengths of the BWP where the PDCCH that scheduled or activated the associated SL grant was transmitted. sl0 corresponds to 0 slots, sl1 corresponds to 1 slot, sl2 corresponds to 2 slots, and so on.

=======Option 2 End=======

=======Option 3 Start=======

DRX-ConfigSL Field Descriptions
drx-HARQ-RTT-TimerSL
Value in number of symbols of the BWP where the PUCCH was transmitted.
drx-RetransmissionTimerSL
Value in number of slot lengths of the BWP where the PUCCH was transmitted. sl0 corresponds to 0 slots, sl1 corresponds to 1 slot, sl2 corresponds to 2 slots, and so on.

=======Option 3 End=======

=======Option 4 Start=======

SL-ConfiguredGrantConfig

The IE SL-ConfiguredGrantConfig specifies the configured grant configuration information for $N_R$ sidelink communication.

| SL-ConfiguredGrantConfig information element |
|---|
| -- ASN1 START <br> -- TAG-SL-CONFIGUREDGRANTCONFIG-START <br> SL-ConfiguredGrantConfig-r16 ::=                 SEQUENCE { <br>   sl-ConfigIndexCG-r16                              SL-ConfigIndexCG-r16, <br>   sl-PeriodCG-r16                                   SL-PeriodCG-r16 <br>   OPTIONAL, -- Need M <br>   sl-NrOfHARQ-Processes-r16                   INTEGER (1..16) <br>   OPTIONAL, -- Need M <br>   sl-HARQ-ProcID-offset-r16                   INTEGER (0..15) <br>   OPTIONAL, -- Need M <br>   sl-CG-MaxTransNumList-r16                   SL-CG-MaxTransNumList-r16 <br>   OPTIONAL, -- Need M <br>   rrc-ConfiguredSidelinkGrant-r16             SEQUENCE { <br>     sl-TimeResourceCG-Type1-r16              INTEGER (0..496) <br>   OPTIONAL, -- Need M <br>     sl-StartSubchannelCG-Type1-r16          INTEGER (0..26) <br>   OPTIONAL, -- Need M <br>     sl-FreqResourceCG-Type1-r16              INTEGER (0..6929) <br>   OPTIONAL, -- Need M <br>     sl-TimeOffsetCG-Type1-r16                INTEGER (0. . 7999) <br>   OPTIONAL, -- Need R <br>     sl-N1PUCCH-AN-r16                        PUCCH-ResourceId <br>   OPTIONAL, -- Need M <br>     sl-PSFCH-ToPUCCH-CG-Type1-r16           INTEGER (0..15) <br>   OPTIONAL, -- Need M <br>     sl-ResourcePoolID-r16                    SL-ResourcePoolID-r16 <br>   OPTIONAL, -- Need M <br>     sl-TimeReferenceSFN-Type1-r16           ENUMERATED {sfn512} <br>   OPTIONAL -- Need S <br>     BWP-Id                BWP-Id, <br>     Cell-Id                 ServCellIndex <br>   } <br>   OPTIONAL, -- Need M |

| SL-ConfiguredGrantConfig information element |
|---|
| ...,<br>[[<br>  sl-N1PUCCH-AN-Type2-r16                         PUCCH-ResourceId<br>OPTIONAL -- Need M<br>  ]]<br>} |

DRX-ConfigSL Field Descriptions
drx-HARQ-RTT-TimerSL
Value in number of symbols of the BWP where the PDCCH scheduling SL grant was transmitted, or the BWP indicated in rrc-ConfiguredSidelinkGrant otherwise.
drx-RetransmissionTimerSL
Value in number of slot lengths of the BWP where the PDCCH scheduling SL grant was transmitted or the BWP indicated in rrc-ConfiguredSidelinkGrant otherwise. sl0 corresponds to 0 slots, sl1 corresponds to 1 slot, sl2 corresponds to 2 slots, and so on.

======Option 4 End======

======Option 5 Start======

SL-ConfiguredGrantConfig
The IE SL-ConfiguredGrantConfig specifies the configured grant configuration information for $N_R$ sidelink communication.

| SL-ConfiguredGrantConfig information element |
|---|
| -- ASN1 START<br>-- TAG-SL-CONFIGUREDGRANTCONFIG-START<br>SL-ConfiguredGrantConfig-r16 ::=            SEQUENCE {<br>  sl-ConfigIndexCG-r16                      SL-ConfigIndexCG-r16,<br>  sl-PeriodCG-r16                            SL-PeriodCG-r16<br>OPTIONAL, -- Need M<br>  sl-NrOfHARQ-Processes-r16           INTEGER (1..16)<br>OPTIONAL, -- Need M<br>  sl-HARQ-ProcID-offset-r16           INTEGER (0..15)<br>OPTIONAL, -- Need M<br>  sl-CG-MaxTransNumList-r16           SL-CG-MaxTransNumList-r16<br>OPTIONAL, -- Need M<br>  rrc-ConfiguredSidelinkGrant-r16      SEQUENCE {<br>    sl-TimeResourceCG-Type1-r16       INTEGER (0..496)<br>OPTIONAL, -- Need M<br>    sl-StartSubchannelCG-Type1-r16    INTEGER (0..26)<br>OPTIONAL, -- Need M<br>    sl-FreqResourceCG-Type1-r16       INTEGER (0..6929)<br>OPTIONAL, -- Need M<br>    sl-TimeOffsetCG-Type1-r16         INTEGER (0..7999)<br>OPTIONAL, -- Need R<br>    sl-N1PUCCH-AN-r16                  PUCCH-ResourceId<br>OPTIONAL, -- Need M<br>    sl-PSFCH-ToPUCCH-CG-Type1-r16     INTEGER (0..15)<br>OPTIONAL, -- Need M<br>    sl-ResourcePoolID-r16             SL-ResourcePoolID-r16<br>OPTIONAL, -- Need M<br>    sl-TimeReferenceSFN-Type1-r16     ENUMERATED { sfn512}<br>OPTIONAL -- Need S<br>    subcarrierSpacing                   SubcarrierSpacing,<br>  }<br>OPTIONAL, -- Need M<br>  ...,<br>  [[<br>  sl-N1PUCCH-AN-Type2-r16              PUCCH-ResourceId<br>OPTIONAL -- Need M<br>  ]]<br>} |

DRX-ConfigSL Field Descriptions
drx-HARQ-RTT-TimerSL
Value in number of symbols of the BWP where the PDCCH scheduling SL grant was transmitted, or number of symbols of the subcarrier spacing indicated in rrc-ConfiguredSidelinkGrant otherwise.
drx-RetransmissionTimerSL
Value in number of slot lengths of the BWP where the PDCCH scheduling SL grant was transmitted or number of slot lengths of the subcarrier spacing indicated in rrc-ConfiguredSidelinkGrant otherwise. sl0 corresponds to 0 slots, sl1 corresponds to 1 slot, sl2 corresponds to 2 slots, and so on.

=======Option 5 End=======

=======Option 6 Start=======

DRX-ConfigSL
The IE DRX-ConfigSL is used to configure additional DRX parameters for the UE performing sidelink operation with resource allocation mode 1, as specified in TS 38.321 [3].

| DRX-ConfigSL information element |
| --- |
| -- ASN1 START<br>-- TAG-DRX-CONFIGSL-START<br>DRX-ConfigSL-r17 ::=         SEQUENCE {<br>   drx-HARQ-RTT-TimerSL-r17        INTEGER (0..56),<br>   drx-RetransmissionTimerSL-r17   ENUMERATED {sl0, sl1, sl2, sl4, sl6, sl8, sl16, sl24, sl33, sl40, sl64, sl80, sl96, sl112, sl128,<br>                                                          sl160, sl320, spare15, spare14, spare13, spare12, spare11, spare10, spare9, spare8,<br>                                                          spare7, spare6, spare5, spare4, spare3, spare2, spare1},<br>   subcarrierSpacing              SubcarrierSpacing,<br>}<br>-- TAG-DRX-CONFIGSL-STOP<br>ASN1STOP |

DRX-ConfigSL Field Descriptions
drx-HARQ-RTT-TimerSL
Value in number of symbols of the subcarrier spacing.
drx-RetransmissionTimerSL
Value in number of slot lengths of the subcarrier spacing. sl0 corresponds to 0 slots, sl1 corresponds to 1 slot, sl2 corresponds to 2 slots, and so on.

=======Option 6 End=======

Figure 5:
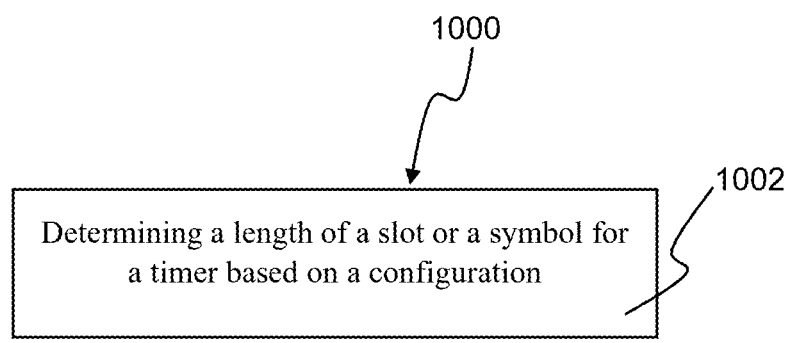
FIG. 5 is a flow diagram of a method of a UE comprising determining a length of a slot or a symbol for a timer based on a configuration, in accordance with embodiments of the present invention.

Referring to FIG. 5, with this and other concepts, systems, and methods of the present invention, a method 1000 for a UE in a wireless communication system comprises determining a length of a slot or a symbol for a timer based on a configuration (step 1002).

In various embodiments, the configuration is a DRX configuration associated with SL.

In various embodiments, the configuration is a configured grant configuration for SL.

Referring back to FIGS. 3 and 4, in one or more embodiments from the perspective of a UE, the device 300 includes a program code 312 stored in memory 310 of the transmitter. The CPU 308 could execute program code 312 to: (i) determine a length of a slot or a symbol for a timer based on a configuration. Moreover, the CPU 308 can execute the program code 312 to perform all of the described actions, steps, and methods described above, below, or otherwise herein.

Figure 6:
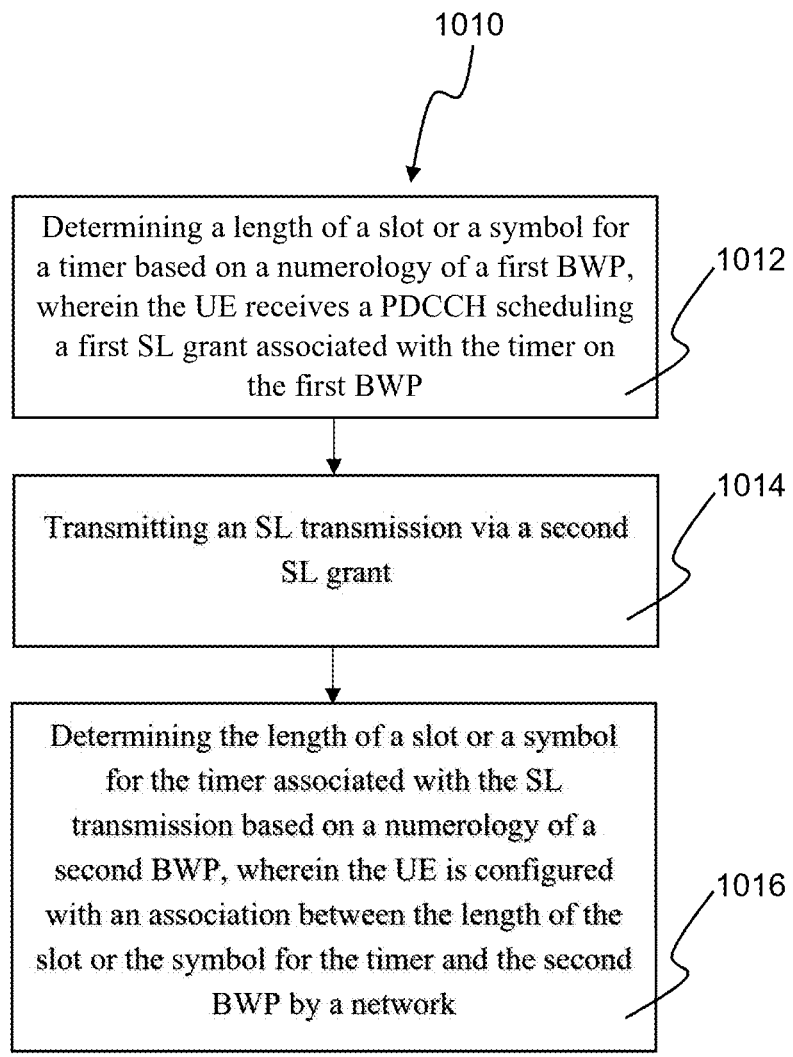
FIG. 6 is a flow diagram of a method of a UE comprising determining a length of a slot or a symbol for a timer based on a numerology of a first BWP, transmitting an SL transmission via a second SL grant, and determining the length of a slot or a symbol for the timer associated with the SL transmission based on a numerology of a second BWP, in accordance with embodiments of the present invention.

Referring to FIG. 6, with this and other concepts, systems, and methods of the present invention, a method 1010 for a UE in a wireless communication system comprises determining a length of a slot or a symbol for a timer based on a numerology of a first BWP, wherein the UE receives a PDCCH scheduling a first SL grant associated with the timer on the first BWP (step 1012), transmitting an SL transmission via a second SL grant (step 1014), and determining the length of a slot or a symbol for the timer associated with the SL transmission based on a numerology of a second BWP, wherein the UE is configured with an association between the length of the slot or the symbol for the timer and the second BWP by a network (node) (step 1016).

In various embodiments, the second SL grant is a configured SL grant.

In various embodiments, the first SL grant is a dynamic SL grant.

In various embodiments, the timer is drx-HARQ-RTT-TimerSL.

In various embodiments, the UE starts the timer after or in response to a PUCCH resource, wherein the PUCCH resource is associated with an SL HARQ feedback associated with an SL transmission.

In various embodiments, the timer is drx-RetransmissionTimerSL.

In various embodiments, the UE monitors DCI or PDCCH when the timer is running.

In various embodiments, the timer is configured as (part of) a DRX configuration by the network (node).

Referring back to FIGS. 3 and 4, in one or more embodiments from the perspective of a UE, the device 300 includes a program code 312 stored in memory 310 of the transmitter. The CPU 308 could execute program code 312 to: (i) determine a length of a slot or a symbol for a timer based on a numerology of a first BWP, wherein the UE receives a PDCCH scheduling a first SL grant associated with the timer on the first BWP; (ii) transmit an SL transmission via a second SL grant; and (iii) determine the length of a slot or a symbol for the timer associated with the SL transmission based on a numerology of a second BWP, wherein the UE is configured with an association between the length of the slot or the symbol for the timer and the second BWP by a network (node). Moreover, the CPU 308 can execute the program code 312 to perform all of the described actions, steps, and methods described above, below, or otherwise herein.

Figure 7:
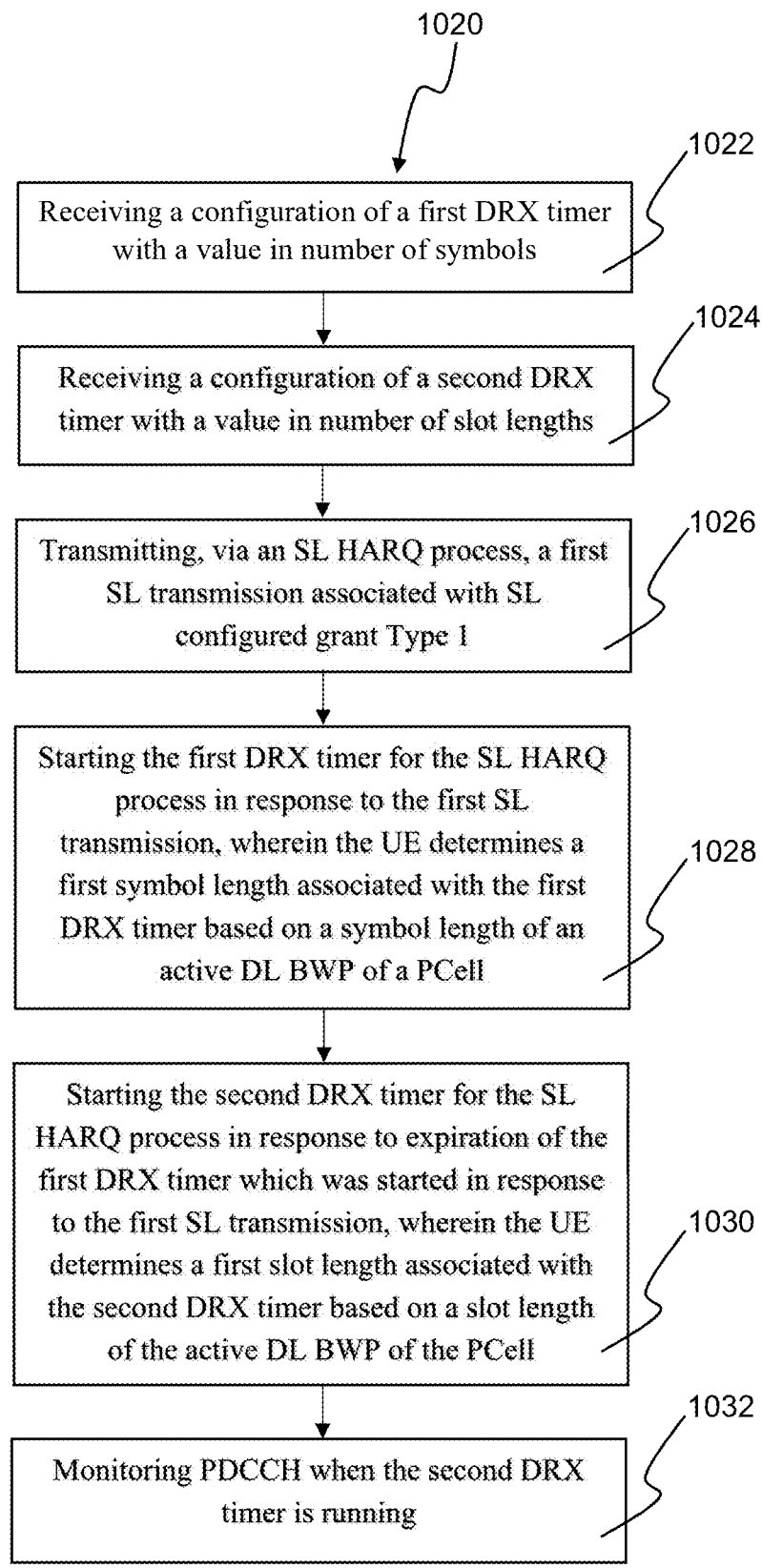
FIG. 7 is a flow diagram of a method of a UE comprising receiving a configuration of a first DRX timer with a value in number of symbols, receiving a configuration of a second DRX timer with a value in number of slot lengths, transmitting, via an SL HAR process, a first SL transmission associated with SL configured grant Type 1, starting the first DRX timer for the SL HARQ process, starting the second DRX timer for the SL HARQ process, and monitoring PDCCH when the second DRX timer is running, in accordance with embodiments of the present invention.

Referring to FIG. 7, with this and other concepts, systems, and methods of the present invention, a method 1020 for a UE in a wireless communication system comprises receiving a configuration of a first DRX timer with a value in number of symbols (step 1022), receiving a configuration of a second DRX timer with a value in number of slot lengths (step 1024), transmitting, via an SL HARQ process, a first SL transmission associated with SL configured grant Type 1 (step 1026), starting the first DRX timer for the SL HARQ process in response to the first SL transmission, wherein the UE determines a first symbol length associated with the first DRX timer based on a symbol length of an active DL BWP of a PCell (step 1028), starting the second DRX timer for the SL HARQ process in response to expiration of the first DRX timer which was started in response to the first SL transmission, wherein the UE determines a first slot length associated with the second DRX timer based on a slot length of the active DL BWP of the PCell (step 1030), and monitoring PDCCH when the second DRX timer is running (step 1032).

In various embodiments, the UE determines a symbol length associated with the first DRX timer and a slot length associated with the second DRX timer based on at least a type of an SL grant.

In various embodiments, the second DRX timer is started in a first symbol after expiration of the first DRX timer.

In various embodiments, the first DRX timer is started in a first symbol after an end of the first SL transmission.

In various embodiments, the first DRX timer is started in a first symbol after an end of a PUCCH transmission carrying an SL HARQ feedback associated with the first SL transmission.

In various embodiments, the method further comprises transmitting, via the SL HARQ process, a second SL transmission associated with SL configured grant Type 2 activated by a first PDCCH; starting the first DRX timer for the SL HARQ process in response to the second SL transmission, wherein the UE determines a second symbol length associated with the first DRX timer (for the SL HARQ process) based on a symbol length of a BWP from where the first PDCCH was transmitted; and starting the second DRX timer for the SL HARQ process in response to expiration of the first DRX timer which was started in response to the second SL transmission, wherein the UE determines a second slot length associated with the second DRX timer (for the SL HARQ process) based on a slot length of the BWP from where the first PDCCH was transmitted.

In various embodiments, the method further comprises transmitting, via the SL HARQ process, a third SL transmission associated with a dynamic SL grant scheduled by a second PDCCH; starting the first DRX timer for the SL HARQ process in response to the third SL transmission, wherein the UE determines a third symbol length associated with the first DRX timer (for the SL HARQ process) based on a symbol length of a BWP from where the second PDCCH was transmitted; and starting the second DRX timer for the SL HARQ process in response to expiration of the first DRX timer which was started in response to the third SL transmission, wherein the UE determines a third slot length associated with the second DRX timer (for the SL HARQ process) based on a slot length of the BWP from where the second PDCCH was transmitted.

In various embodiments, the first DRX timer is drx-HARQ-RTT-TimerSL and the second DRX timer is drx-RetransmissionTimerSL.

In various embodiments, the SL configured grant Type 1 is configured via an RRC message by a network (node).

In various embodiments, an SL transmission is a PSSCH transmission.

Any combination of the above concepts or teachings can be jointly combined or formed to a new embodiment. The disclosed details and embodiments can be used to solve at least (but not limited to) the issues mentioned above and herein.

It is noted that any of the methods, alternatives, steps, examples, and embodiments proposed herein may be applied independently, individually, and/or with multiple methods, alternatives, steps, examples, and embodiments combined together.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects, concurrent channels may be established based on pulse repetition frequencies. In some aspects, concurrent channels may be established based on pulse position or offsets. In some aspects, concurrent channels may be established based on time hopping sequences. In some aspects, concurrent channels may be established based on pulse repetition frequencies, pulse positions or offsets, and time hopping sequences.

Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of ordinary skill in the art would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer program product may comprise packaging materials.

While the invention has been described in connection with various aspects and examples, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method of a User Equipment (UE), comprising:
   receiving a configuration of a first Discontinuous Reception (DRX) timer with a value in number of symbols;
   receiving a configuration of a second DRX timer with a value in number of slot lengths;
   transmitting, via a Sidelink (SL) Hybrid Automatic Repeat Request (HARQ) process, a first SL transmission associated with SL configured grant Type 1;
   starting the first DRX timer for the SL HARQ process in response to the first SL transmission, wherein the UE determines a first symbol length associated with the first DRX timer based on a symbol length of an active Downlink (DL) Bandwidth Part (BWP) of a Primary Cell (PCell);
   starting the second DRX timer for the SL HARQ process in response to expiration of the first DRX timer which was started in response to the first SL transmission, wherein the UE determines a first slot length associated with the second DRX timer based on a slot length of the active DL BWP of the PCell; and
   monitoring Physical Downlink Control Channel (PDCCH) when the second DRX timer is running.

2. The method of claim 1, wherein the UE determines a symbol length associated with the first DRX timer and a slot length associated with the second DRX timer based on at least a type of an SL grant.

3. The method of claim 1, wherein the second DRX timer is started in a first symbol after expiration of the first DRX timer.

4. The method of claim 1, wherein the first DRX timer is started in a first symbol after an end of the first SL transmission.

5. The method of claim 1, wherein the first DRX timer is started in a first symbol after an end of a Physical Uplink Control Channel (PUCCH) transmission carrying an SL HARQ feedback associated with the first SL transmission.

6. The method of claim 1, further comprising:
   transmitting, via the SL HARQ process, a second SL transmission associated with SL configured grant Type 2 activated by a first PDCCH;
   starting the first DRX timer for the SL HARQ process in response to the second SL transmission, wherein the UE determines a second symbol length associated with the first DRX timer based on a symbol length of a BWP from where the first PDCCH was transmitted; and
   starting the second DRX timer for the SL HARQ process in response to expiration of the first DRX timer which was started in response to the second SL transmission, wherein the UE determines a second slot length associated with the second DRX timer based on a slot length of the BWP from where the first PDCCH was transmitted.

7. The method of claim 1, further comprising:
   transmitting, via the SL HARQ process, a third SL transmission associated with a dynamic SL grant scheduled by a second PDCCH;
   starting the first DRX timer for the SL HARQ process in response to the third SL transmission, wherein the UE determines a third symbol length associated with the first DRX timer based on a symbol length of a BWP from where the second PDCCH was transmitted; and
   starting the second DRX timer for the SL HARQ process in response to expiration of the first DRX timer which was started in response to the third SL transmission, wherein the UE determines a third slot length associated with the second DRX timer based on a slot length of the BWP from where the second PDCCH was transmitted.

8. The method of claim 1, wherein the first DRX timer is drx-HARQ-RTT-TimerSL and the second DRX timer is drx-RetransmissionTimerSL.

9. The method of claim 1, wherein the SL configured grant Type 1 is configured via a Radio Resource Control (RRC) message by a network.

10. The method of claim 1, wherein an SL transmission is a Physical Sidelink Shared Channel (PSSCH) transmission.

11. A User Equipment (UE), comprising:
a memory; and
a processor operatively coupled to the memory, wherein the processor is configured to execute a program code stored in the memory to:
receive a configuration of a first Discontinuous Reception (DRX) timer with a value in number of symbols;
receive a configuration of a second DRX timer with a value in number of slot lengths;
transmit, via a Sidelink (SL) Hybrid Automatic Repeat Request (HARQ) process, a first SL transmission associated with SL configured grant Type 1;
start the first DRX timer for the SL HARQ process in response to the first SL transmission, wherein the UE determines a first symbol length associated with the first DRX timer based on a symbol length of an active Downlink (DL) Bandwidth Part (BWP) of a Primary Cell (PCell);
start the second DRX timer for the SL HARQ process in response to expiration of the first DRX timer which was started in response to the first SL transmission, wherein the UE determines a first slot length associated with the second DRX timer based on a slot length of the active DL BWP of the PCell; and
monitor Physical Downlink Control Channel (PDCCH) when the second DRX timer is running.

12. The UE of claim 11, wherein the UE determines a symbol length associated with the first DRX timer and a slot length associated with the second DRX timer based on at least a type of an SL grant.

13. The UE of claim 11, wherein the second DRX timer is started in a first symbol after expiration of the first DRX timer.

14. The UE of claim 11, wherein the first DRX timer is started in a first symbol after an end of the first SL transmission.

15. The UE of claim 11, wherein the first DRX timer is started in a first symbol after an end of a Physical Uplink Control Channel (PUCCH) transmission carrying an SL HARQ feedback associated with the first SL transmission.

16. The UE of claim 11, wherein the processor is further configured to execute the program code to:
transmit, via the SL HARQ process, a second SL transmission associated with SL configured grant Type 2 activated by a first PDCCH;
start the first DRX timer for the SL HARQ process in response to the second SL transmission, wherein the UE determines a second symbol length associated with the first DRX timer based on a symbol length of a BWP from where the first PDCCH was transmitted; and
start the second DRX timer for the SL HARQ process in response to expiration of the first DRX timer which was started in response to the second SL transmission, wherein the UE determines a second slot length associated with the second DRX timer based on a slot length of the BWP from where the first PDCCH was transmitted.

17. The UE of claim 11, wherein the processor is further configured to execute the program code to:
transmit, via the SL HARQ process, a third SL transmission associated with a dynamic SL grant scheduled by a second PDCCH;
start the first DRX timer for the SL HARQ process in response to the third SL transmission, wherein the UE determines a third symbol length associated with the first DRX timer based on a symbol length of a BWP from where the second PDCCH was transmitted; and
start the second DRX timer for the SL HARQ process in response to expiration of the first DRX timer which was started in response to the third SL transmission, wherein the UE determines a third slot length associated with the second DRX timer based on a slot length of the BWP from where the second PDCCH was transmitted.

18. The UE of claim 11, wherein the first DRX timer is drx-HARQ-RTT-TimerSL and the second DRX timer is drx-RetransmissionTimerSL.

19. The UE of claim 11, wherein the SL configured grant Type 1 is configured via a Radio Resource Control (RRC) message by a network.

20. The UE of claim 11, wherein an SL transmission is a Physical Sidelink Shared Channel (PSSCH) transmission.

* * * * *